(12) United States Patent
Alwen et al.

(10) Patent No.: US 10,855,440 B1
(45) Date of Patent: Dec. 1, 2020

(54) GENERATING NEW ENCRYPTION KEYS DURING A SECURE COMMUNICATION SESSION

(71) Applicant: Wickr Inc., San Francisco, CA (US)

(72) Inventors: Joël Alwen, Vienna (AT); Thomas Michael Leavy, River Edge, NJ (US)

(73) Assignee: Wickr Inc., Pleasanton, CA (US)

( * ) Notice: Subject to any disclaimer, the term of this patent is extended or adjusted under 35 U.S.C. 154(b) by 144 days.

(21) Appl. No.: 15/806,471

(22) Filed: Nov. 8, 2017

(51) Int. Cl.
*H04L 9/00* (2006.01)
*H04L 9/08* (2006.01)

(52) U.S. Cl.
CPC .............. *H04L 9/00* (2013.01); *H04L 9/0819* (2013.01); *H04L 9/0816* (2013.01); *H04L 9/0838* (2013.01)

(58) Field of Classification Search
CPC . H04L 9/00; H04L 9/08; H04L 9/0819; H04L 9/0816; H04L 9/0838
See application file for complete search history.

(56) References Cited

U.S. PATENT DOCUMENTS

| | | | |
|---|---|---|---|
| 4,924,515 A | 5/1990 | Matyas et al. | |
| 5,103,478 A | 4/1992 | Matyas et al. | |
| 5,150,408 A | 9/1992 | Bright | |
| 6,263,435 B1 | 7/2001 | Dondeti et al. | |
| 6,289,450 B1 | 9/2001 | Pensak et al. | |
| 6,584,566 B1 | 6/2003 | Hardjono | |
| 6,606,706 B1 | 8/2003 | Li | |
| 6,742,116 B1 | 5/2004 | Matsui et al. | |
| 6,785,809 B1 | 8/2004 | Hardjono | |
| 6,912,656 B1 | 6/2005 | Perlman et al. | |
| 7,171,001 B2 | 1/2007 | Tuvell et al. | |
| 7,509,491 B1 | 3/2009 | Wainner et al. | |
| 8,127,350 B2 | 2/2012 | Wei et al. | |
| 8,295,306 B2 | 10/2012 | Bagepalli et al. | |
| 8,447,970 B2 | 5/2013 | Klein et al. | |
| 8,503,621 B2 | 8/2013 | Patel et al. | |
| 8,503,681 B1 | 8/2013 | McGrew et al. | |
| 8,526,616 B2 | 9/2013 | Feudo et al. | |
| 8,750,507 B2 | 6/2014 | Roosta et al. | |
| 8,954,740 B1 | 2/2015 | Moscaritolo et al. | |
| 9,197,616 B2 | 11/2015 | Sinha | |
| 9,413,882 B2 | 8/2016 | Gisby et al. | |
| 9,591,479 B1 | 3/2017 | Leavy et al. | |
| 9,596,079 B1 | 3/2017 | Kasabwala et al. | |
| 9,674,163 B1 | 6/2017 | Feudo et al. | |

(Continued)

OTHER PUBLICATIONS

Ng et al., A novel JavaCard-based authentication system for secured transactions on the Internet, Proceedings IEEE International Conference on Networks, Sep. 2000, pp. 262-266 (Year: 2000).*

(Continued)

*Primary Examiner* — Kenneth W Chang
(74) *Attorney, Agent, or Firm* — Banner & Witcoff, Ltd.

(57) ABSTRACT

The present application describes a method, system, and non-transitory computer-readable medium for generating new keys during a secure communication session. A key derivation function is operatively connected to both a counter and a memory. The key derivation function generates new key material from a first input and a second input in response to a signal provided by the counter. The key derivation function generates the new key material and outputs it to the memory.

20 Claims, 12 Drawing Sheets

(56) References Cited

U.S. PATENT DOCUMENTS

| | | | |
|---|---|---|---|
| 10,116,637 B1 | 10/2018 | Kasabwala et al. | |
| 10,129,229 B1 | 11/2018 | Leavy et al. | |
| 10,135,612 B1 | 11/2018 | Leavy et al. | |
| 2002/0037736 A1 | 3/2002 | Kawaguchi et al. | |
| 2002/0062440 A1 | 5/2002 | Akama | |
| 2002/0154776 A1 | 10/2002 | Sowa et al. | |
| 2002/0172359 A1* | 11/2002 | Saarinen | G06F 7/588 380/46 |
| 2002/0178354 A1* | 11/2002 | Ogg | G06Q 20/382 713/155 |
| 2003/0126464 A1 | 7/2003 | McDaniel et al. | |
| 2003/0149876 A1* | 8/2003 | McGough | H04L 9/0844 713/171 |
| 2004/0054891 A1 | 3/2004 | Hengeveld et al. | |
| 2004/0111600 A1* | 6/2004 | Kaler | H04L 9/0891 713/150 |
| 2004/0210725 A1 | 10/2004 | DeRoo et al. | |
| 2005/0097317 A1 | 5/2005 | Trostle et al. | |
| 2005/0187966 A1 | 8/2005 | Lino | |
| 2005/0193191 A1 | 9/2005 | Sturgis | |
| 2005/0198170 A1 | 9/2005 | LeMay et al. | |
| 2005/0204161 A1 | 9/2005 | Caronni | |
| 2005/0246553 A1 | 11/2005 | Nakamura et al. | |
| 2006/0029226 A1 | 2/2006 | Han et al. | |
| 2006/0129812 A1* | 6/2006 | Mody | H04L 63/04 713/168 |
| 2006/0168446 A1 | 7/2006 | Ahonen et al. | |
| 2006/0193473 A1 | 8/2006 | Fu | |
| 2006/0291662 A1 | 12/2006 | Takahashi et al. | |
| 2007/0016663 A1 | 1/2007 | Weis | |
| 2007/0140480 A1 | 6/2007 | Yao | |
| 2007/0143600 A1 | 6/2007 | Kellil et al. | |
| 2007/0198836 A1 | 8/2007 | Fedyk et al. | |
| 2007/0199071 A1* | 8/2007 | Callas | H04L 9/3073 726/26 |
| 2008/0019528 A1 | 1/2008 | Kneissler | |
| 2008/0049941 A1 | 2/2008 | Kim et al. | |
| 2008/0162929 A1 | 7/2008 | Ishikawa et al. | |
| 2008/0165952 A1 | 7/2008 | Smith et al. | |
| 2008/0318546 A1 | 12/2008 | Kitazoe et al. | |
| 2009/0068986 A1 | 3/2009 | Wang et al. | |
| 2009/0070586 A1 | 3/2009 | Bucker et al. | |
| 2009/0190764 A1 | 7/2009 | Liu | |
| 2009/0235343 A1 | 9/2009 | Sheehan | |
| 2009/0271612 A1 | 10/2009 | Liu | |
| 2010/0017607 A1 | 1/2010 | Shkolnikov et al. | |
| 2010/0031038 A1 | 2/2010 | Kruegel et al. | |
| 2010/0074446 A1 | 3/2010 | Fuchs et al. | |
| 2010/0146259 A1 | 6/2010 | Tatham | |
| 2010/0153727 A1* | 6/2010 | Reznik | H04W 12/04033 713/171 |
| 2010/0296655 A1 | 11/2010 | Solow et al. | |
| 2011/0135097 A1 | 6/2011 | Redfern et al. | |
| 2011/0182426 A1 | 7/2011 | Roosta et al. | |
| 2011/0317834 A1* | 12/2011 | Chaturvedi | H04L 63/061 380/255 |
| 2012/0170743 A1 | 7/2012 | Senese et al. | |
| 2012/0243683 A1 | 9/2012 | Oba et al. | |
| 2012/0257756 A1 | 10/2012 | Huang et al. | |
| 2013/0070925 A1 | 3/2013 | Yamada et al. | |
| 2013/0086385 A1* | 4/2013 | Poeluev | H04L 9/3252 713/176 |
| 2013/0173905 A1 | 7/2013 | Inatomi et al. | |
| 2014/0101444 A1 | 4/2014 | Lee et al. | |
| 2014/0233736 A1 | 8/2014 | Zhang et al. | |
| 2014/0325220 A1 | 10/2014 | Tunnell et al. | |
| 2015/0067185 A1 | 3/2015 | Tamblin et al. | |
| 2015/0195261 A1 | 7/2015 | Gehrmann et al. | |
| 2015/0244720 A1 | 8/2015 | Suh | |
| 2015/0295713 A1* | 10/2015 | Oxford | H04L 63/0478 713/171 |
| 2015/0295936 A1 | 10/2015 | Wang | |
| 2015/0319205 A1 | 11/2015 | Fan et al. | |
| 2016/0065362 A1 | 3/2016 | Choyi et al. | |
| 2016/0080149 A1 | 3/2016 | Mehta et al. | |
| 2018/0095500 A1 | 4/2018 | Cohn et al. | |

OTHER PUBLICATIONS

Author Unknown, "Threema Cryptography Whitepaper" Threema, Mar. 9, 2015.

Marlinspike, Moxie. Advanced Cryptographic Ratcheting. Nov. 26, 2013.

Moscaritolo et al. "Silent Circle Instant Messaging Protocol Protocol Specification" Silent Circle Engineering, Dec. 5, 2012, Version 1.0.

WhatsApp Encryption Overview Technical White Paper. Apr. 4, 2016.

E. Rescorla et al. RFC 4347: Datagram Transport Layer Security. Apr. 2006.

M. Baugher et al. RFC 3711: The Secure Real-time Transport Protocol (SRTP). Mar. 2004.

Wire Security Whitepaper. Sep. 28, 2017.

Apple. iOS Security: iOS 9.0 or later. Sep. 2015.

* cited by examiner

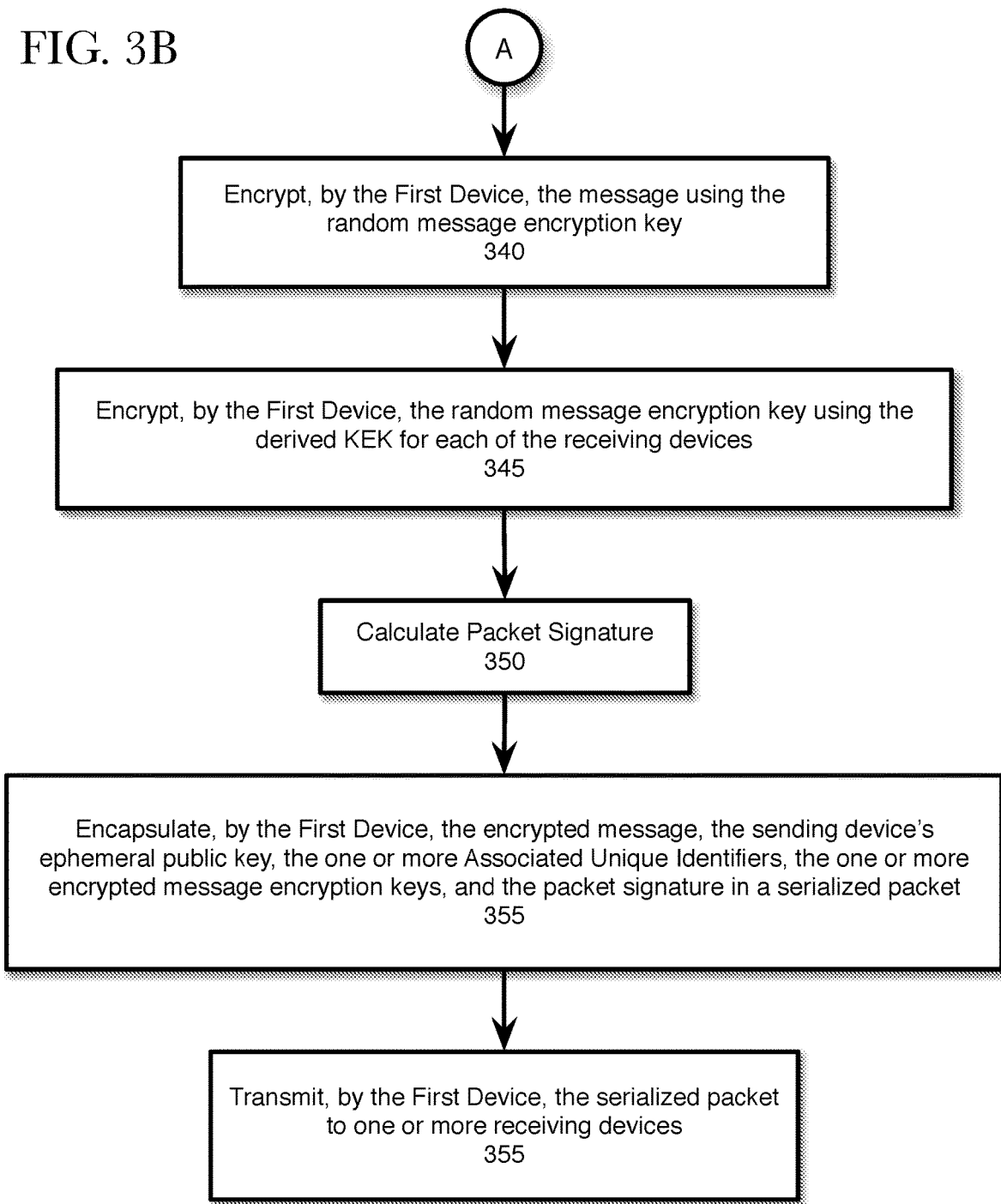

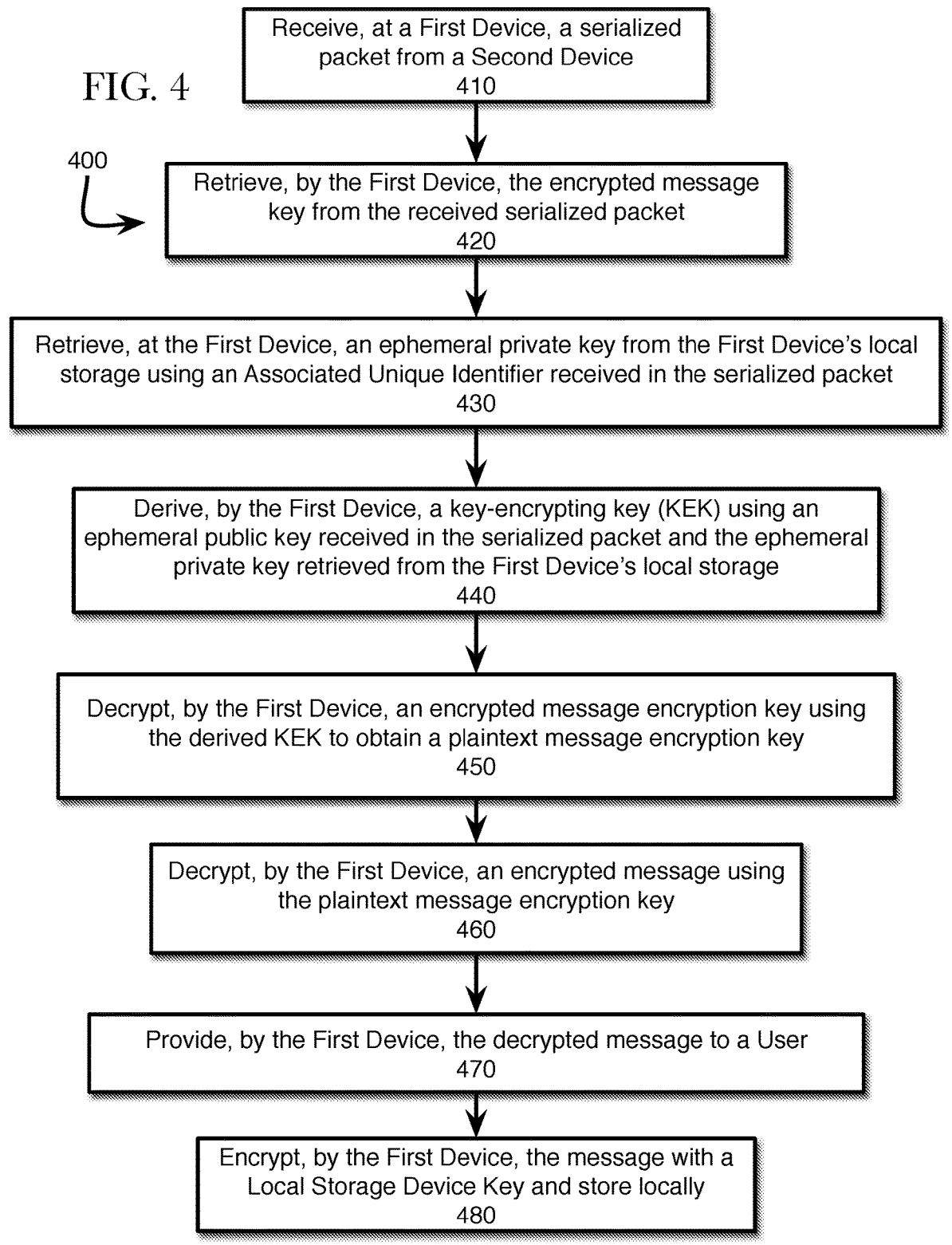

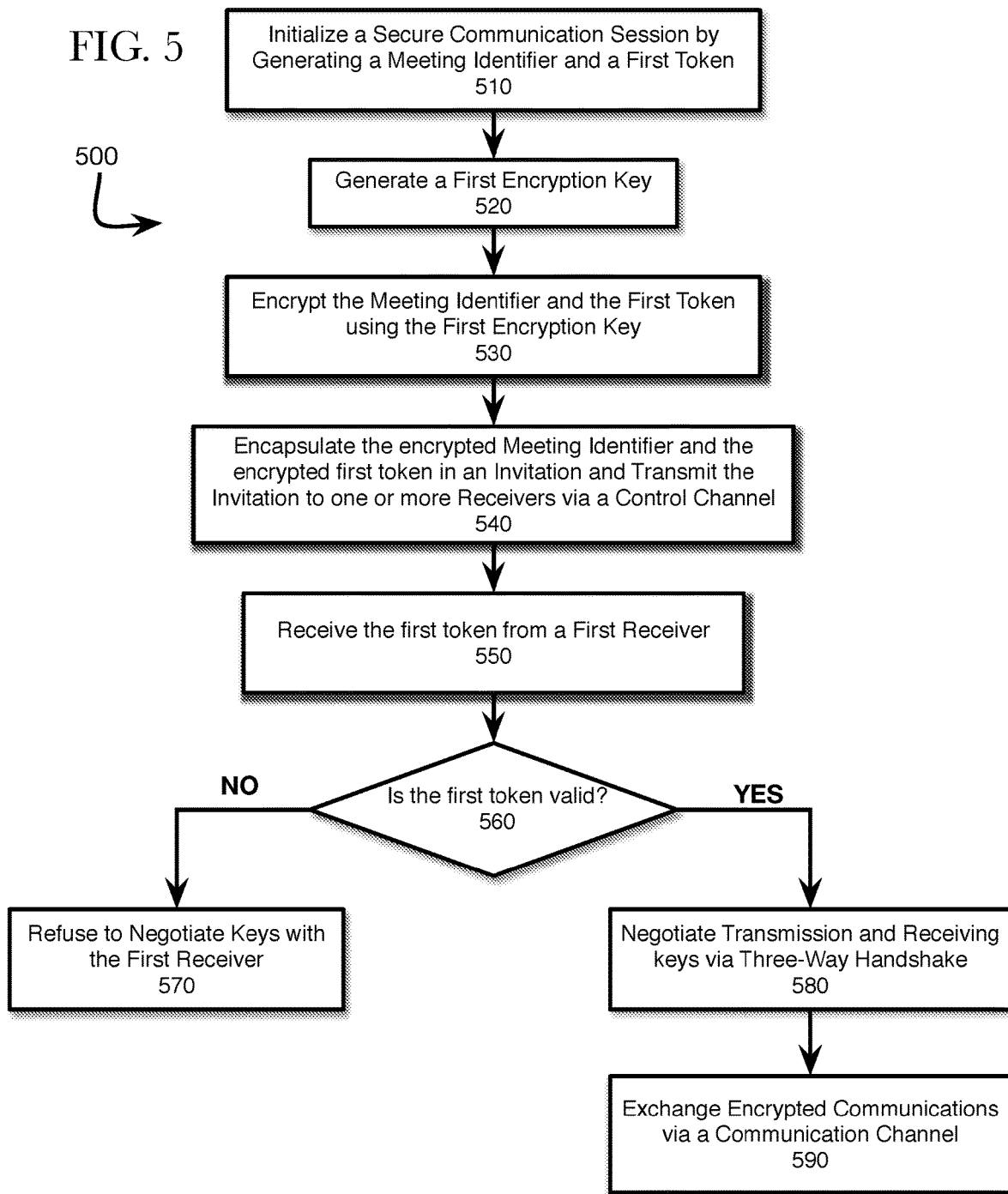

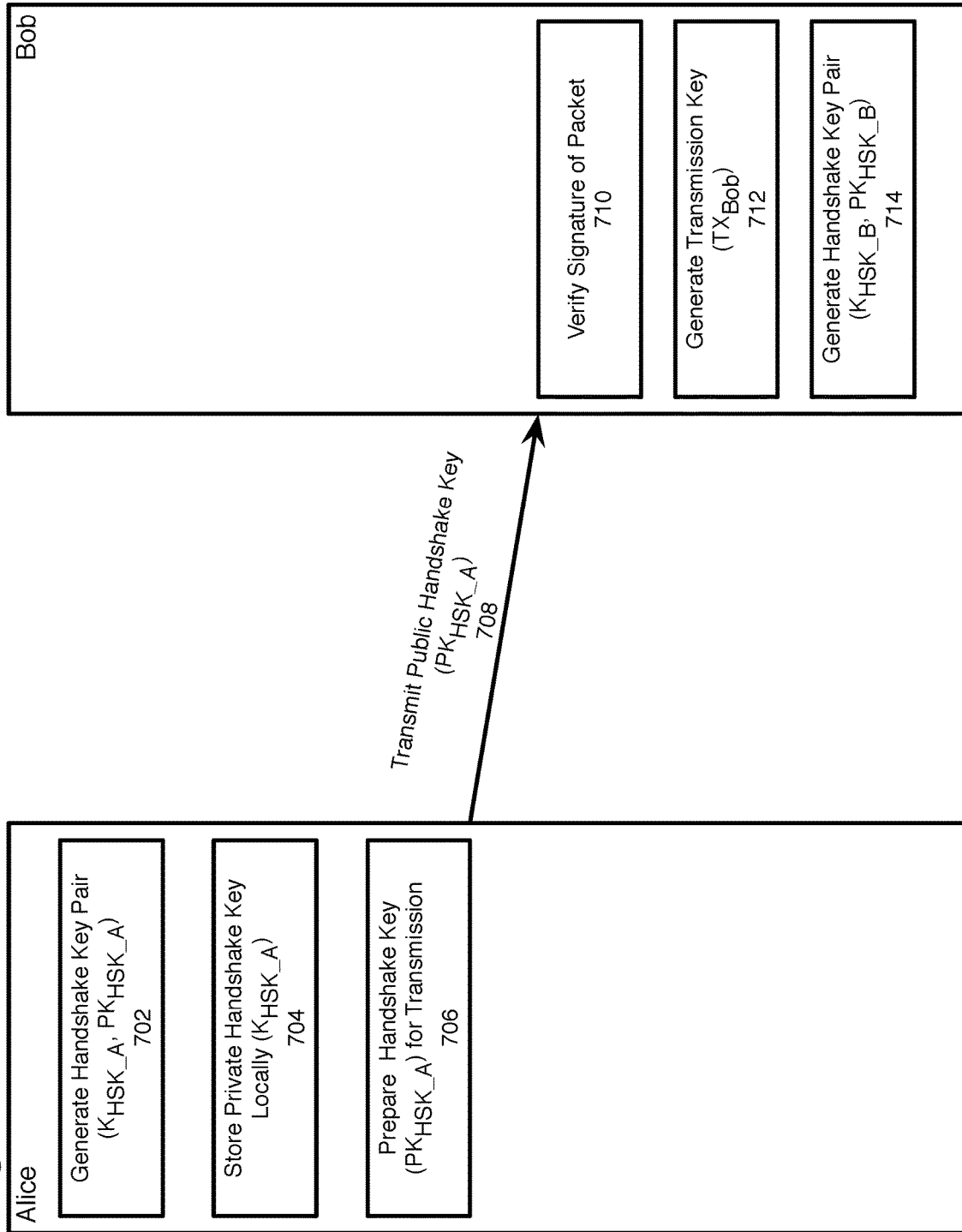

GENERATING NEW ENCRYPTION KEYS DURING A SECURE COMMUNICATION SESSION

STATEMENT REGARDING FEDERALLY SPONSORED RESEARCH OR DEVELOPMENT

This invention was made with Government support under Contract No. 2014-14031000011 awarded by the Central Intelligence Agency. The Government has certain rights in the invention.

CROSS-REFERENCE TO RELATED APPLICATIONS

This application is related to co-pending applications U.S. Ser. No. 15/806,465, entitled "End-to-End Encryption During a Secure Communication Session," and U.S. Ser. No. 15/806,468, entitled "End-to-End Encryption During a Secure Communication Session," filed concurrently herewith, the entireties of which are incorporated by reference herein.

BACKGROUND

Traditionally, configuring an encrypted calling session included transmitting an encryption key to other members of the calling session via an out-of-band communication. The encryption key is then used to encrypt and decrypt calling data received over the communication channel. While this provides for encrypted calling sessions, there is a technical problem with updating keys during the call using out-of-band techniques. Participants may not receive the key via the out-of-band communication or the out-of-band communication may be delayed. This may result in jitter, lost communications, or unauthorized participants remaining on a call. Thus, there is a need to update encryption keys in-band during an encrypted call.

BRIEF SUMMARY

The present disclosure describes a secure key exchange performed over a secure channel. Specifically, the secure channel is a streaming channel that allows each participant to select his or her own key for transmitting encrypted data to other participants. Each participant manages the state information of the secure channel, including other participants' stream identifiers and the keys associated with those stream identifiers.

The present application describes a method for end-to-end encryption during a secure communication session. The method includes a first device initializing a secure communication session with at least one second device. Initializing the secure communication session includes transmitting an invitation to a secure communication session to the at least one second device. The invitation may include a meeting identifier and a token. Next, the method receives the token from the at least one second device and validates the token. When the token is invalid, the first devices terminates the secure communication session. However, when the token is valid, the first device performs a three-way handshake with the at least one second device to negotiate a first encryption key and a second encryption key. The first encryption key is used to encrypt communication data transmitted by the first device and the second encryption key is used to decrypt communication data received from the at least one second device. After the keys are negotiated, the first device, encrypts first communication data using the first encryption key and transmits the encrypted first communication data to the at least one second device.

During the secure communication session, the first device may detect an event, such as a participant joining or leaving. This may prompt a second three-way handshake between the first device and the at least one second device. According to some examples, the first device may provide the at least one second device with a stream identifier, which is included in the encrypted first communication data.

According to another aspect of the disclosure, a system for end-to-end encryption during a secure communication session. The system includes a processor, an interface, and a memory. The processor is configured to initialize a secure communication session with at least one second device, perform a three-way handshake with the at least one second device to negotiate a first encryption key and a second encryption key for the secure communication session, and encrypt first communication data using the first encryption key. Additionally, the processor decrypts encrypted second communication data received from the at least one second device using the second encryption key and validates a token prior to performing the three-way handshake. The interface transmits the encrypted first communication data to the at least one second device, receives encrypted second communication data from the at least one second device, and receive the token from the at least one second device. The memory stores the first encryption key and the second encryption key.

Another aspect of the disclosure describes a non-transitory computer-readable medium comprising instructions that initialize a secure communication session with at least one second device. Initializing the secure communication session includes transmitting an invitation, that includes a token, to the at least one second device. The instructions receive the token from the at least one second device and validate it. When the token is invalid, the instructions terminate the secure communication session. However, when the token is valid, the instructions perform a three-way handshake with the at least one second device to negotiate a first encryption key and a second encryption key for the secure communication session. After negotiating the keys, the instructions include encrypting first communication data using the first encryption key and transmitting the encrypted first communication data to the at least one second device. According to another aspect, the instructions may include performing a second three-way handshake between the first device and the at least one second device when an event is detected.

According to another example of the current disclosure, a method for end-to-end encryption during a secure communication session is disclosed. The method includes receiving an invitation to a secure communication session. In some examples, the invitation includes a token, which is transmitted to the device that transmitted the invitation. After transmitting the token, the method includes performing a three-way handshake with the at least one second device to negotiate a first encryption key and a second encryption key for the secure communication session. The method further includes encrypting first communication data using the first encryption key and transmitting the encrypted first communication data to another device.

In some examples, the method includes providing a first stream identifier to the other device. Accordingly, the encrypted first communication data transmitted to the other device includes the first stream identifier. In other examples, the method includes receiving second encrypted communication data and decrypting the second encrypted communication data with the second key. The second encrypted communication data may include a second stream identifier that is used to retrieve the second encryption key.

One aspect of the disclosure includes a system for end-to-end encryption during a secure communication session that includes an interface, a processor, and a memory. The interface is configured to receive an invitation to a secure communication session, transmit encrypted first communication data to at least one second device, and receive encrypted second communication data from the at least one second device. The processor is configured to perform a three-way handshake with the at least one second device to negotiate a first encryption key and a second encryption key for the secure communication session and encrypt first communication data using the first encryption key. The memory stores the first encryption key and the second encryption key negotiated between the devices.

Another example of the disclosure describes a non-transitory computer-readable medium that includes instructions for end-to-end encryption during a secure communication session. The instructions include receiving an invitation to a secure communication session. In some examples, the invitation includes a token, which is transmitted to the device that transmitted the invitation. After transmitting the token, the instructions include performing a three-way handshake with the at least one second device to negotiate a first encryption key and a second encryption key for the secure communication session. The instructions also include encrypting first communication data using the first encryption key and transmitting the encrypted first communication data to another device.

In some examples, the instructions include providing a first stream identifier to the other device. Accordingly, the encrypted first communication data transmitted to the other device includes the first stream identifier. In other examples, the instructions include receiving second encrypted communication data and decrypting the second encrypted communication data with the second key. The second encrypted communication data may include a second stream identifier that is used to retrieve the second encryption key.

Another aspect of the disclosure describes a method for generating new encryption keys during a secure communication session. The method includes a first device deriving a first encryption key and a first nonce. The first encryption key and the first nonce are stored in memory. The method includes inputting the first encryption key and the first nonce into a key derivation function in response to an event. The key derivation function generates a second encryption key and a second nonce, which are stored in memory, such as a buffer.

In some examples, the first device encrypts first communication data using the first encryption key and transmitting the encrypted first communication data to at least one second device during a first secure communication session prior to the event. After the event, the first device encrypts second communication data using the second encryption key. The encrypted second communication data is transmitted to the at least one second device during the first secure communication session. The event that triggers the key update may include an exchange of a predetermined number of packets or a predetermined amount of time elapsing.

One aspect of the disclosure describes a system for generating new keys during a secure communication session. The system includes a key derivation function to generate key material from a first input and a second input, a counter connected to the key derivation function to provide a signal to the key derivation function to generate the key material, and a memory connected to the key derivation function to receive the generated key material outputted from the key derivation function. In some examples, the first input is a first encryption key and the second input is a first nonce value.

According to other aspects, the counter provides the signal to the key derivation function in response to an event, such as an exchange of a predetermined number of packets or an elapse of a predetermined amount of time. Further, the key material outputted from the key derivation function includes a second encryption key and a second nonce value.

Another aspect of the present disclosure describes a non-transitory computer-readable medium that include instructions for generating new keys during a secure communication session. The instructions include deriving a first encryption key and a first nonce. The first encryption key and the first nonce are stored in memory. The instructions input the first encryption key and the first nonce into a key derivation function in response to an event. The key derivation function generates a second encryption key and a second nonce, which are stored in memory, such as a buffer.

In some examples, the instructions include encrypting first communication data using the first encryption key and transmitting the encrypted first communication data to at least one second device during a first secure communication session prior to the event. After the event, the instructions include encrypting second communication data using the second encryption key. The encrypted second communication data is transmitted to the at least one second device during the first secure communication session. The event that triggers the key update may include an exchange of a predetermined number of packets or a predetermined amount of time elapsing.

BRIEF DESCRIPTION OF THE DRAWINGS

Various examples of the invention are disclosed in the following detailed description and the accompanying drawings.

FIGS. 3A and 3B illustrate an exemplary process for transmitting an encrypted messaging according to the present disclosure.

FIG. 4 shows an illustrative method for decrypting an encrypted message according to one example of the disclosure.

FIG. 5 illustrates an exemplary process for an initiating an encrypted communication session.

FIGS. 7A-7C show a process for performing a three-way handshake to negotiate transmission and receiving keys.

DETAILED DESCRIPTION

The present disclosure can be implemented in numerous ways, including as a process; an apparatus; a system; a composition of matter; a computer program product embodied on a non-transitory computer readable storage medium; and/or a processor, such as a processor configured to execute instructions stored on and/or provided by a memory coupled to the processor. These implementations, or any other form that the present disclosure may take, may be referred to as techniques. In general, the order of the steps of disclosed processes may be altered within the scope of the present disclosure. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more examples of the present disclosure is provided below along with accompanying figures that illustrate the principles of the present disclosure. The present disclosure is described in connection with such examples, but the present disclosure is not limited to any example. The scope of the present disclosure is limited only by the claims and the present disclosure encompasses numerous alternatives, modifications, and equivalents. Numerous specific details are set forth in the following description in order to provide a thorough understanding of the present disclosure. These details are provided for the purpose of example and the present disclosure may be practiced according to the claims without some or all of these specific details. For the purpose of clarity, technical material that is known in the technical fields related to the present disclosure has not been described in detail so that the present disclosure is not unnecessarily obscured.

Figure 1:
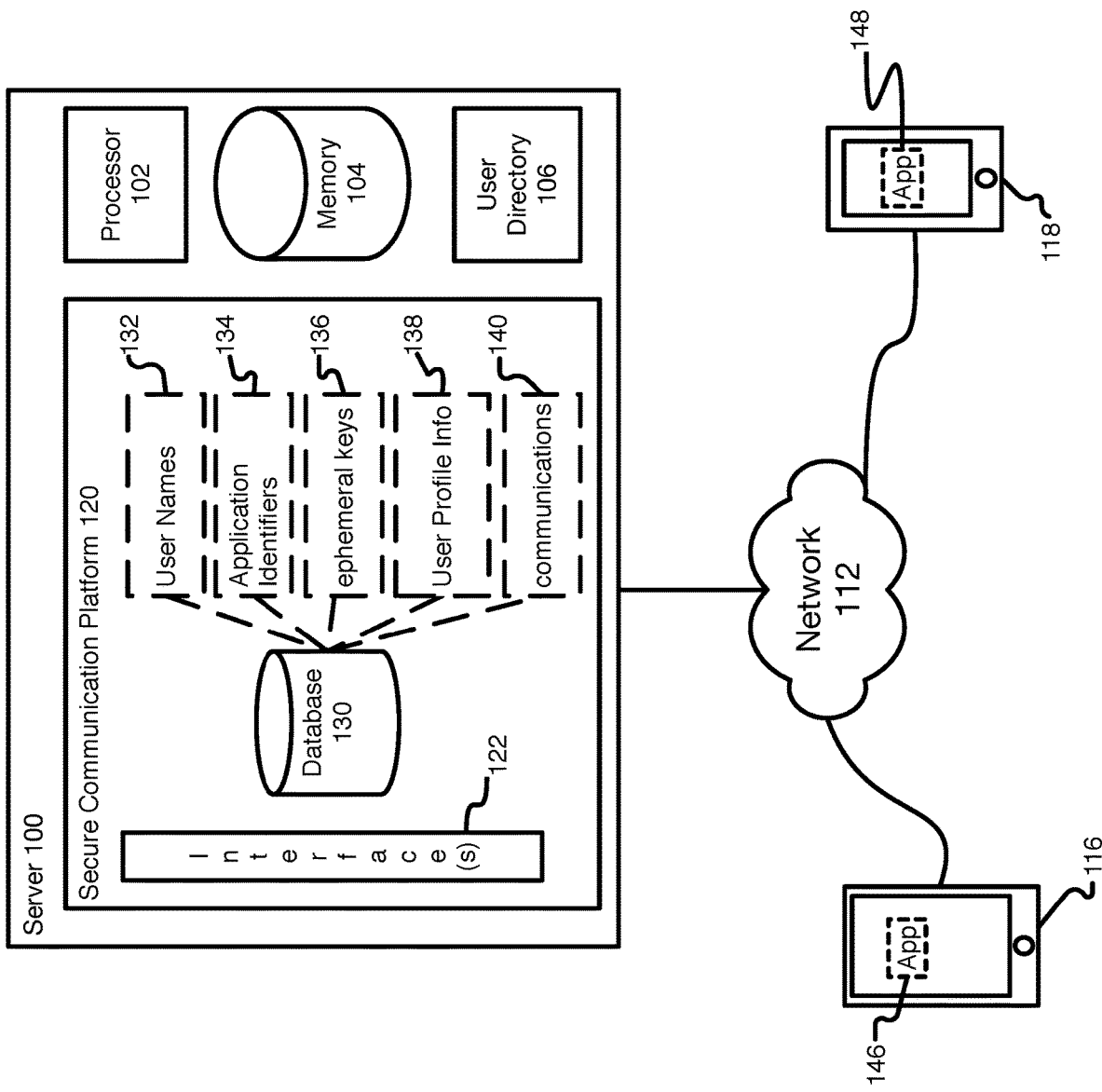
FIG. 1 illustrates an example of an environment where secure communications are exchanged.

FIG. 1 illustrates an example of an environment in which secure communications are exchanged. Specifically, FIG. 1 shows a first client device 116 and a second client device 118 connected to secure communication platform 120, located on server 100, via network 112.

Typically, secure communications are exchanged using serialized packets. The serialized packets allow information, such as encryption information, hardware binding information, message security controls, and decryption information—for multiple receivers (as applicable)—to securely travel with the message and/or communication. The serialized packets also provide cross-platform support so that users may communicate regardless of their operating systems (e.g., Linux, iOS, and Windows), smart phone platforms (e.g., iPhone, Android, Windows, Blackberry, etc.), and device types (e.g., mobile smart phones, tablets, laptops, desktops, etc.). Using the techniques described herein, only intended accounts on intended devices are able to decrypt the messages and/or communications. Accordingly, secure communication platform 120 is unable to decrypt messages and/or communications. As will further be described in greater detail below, using the techniques described herein, communication participants can maintain a forward and backward secret secure communication channel, whether communicating synchronously (e.g., where all participants are online or otherwise able to communicate with platform 120) or asynchronously (e.g., where at least one participant is offline or otherwise not in communication with platform 120).

As shown in FIG. 1, secure communication platform 120 may be implemented on server 100. Server 100 may include a processor 102, memory 104, user directory 106, and the secure communication platform 120. In this regard, server 100 may be a stand-alone server, a corporate server, or a server located in a server farm or cloud-computing environment. In some examples, server 100 may be a cloud service provider running a virtual machine configured to provide secure communication platform 120 to an enterprise as a Software as a Service (SaaS).

Processor 102 may be any conventional processor capable of interacting with memory 104, user directory 106, and secure communication platform 120. In this regard, processor 102 may include a processor, a multiprocessor, a multicore processor, or any combination thereof. Alternatively, processor 102 may be a dedicated controller, such as an Application Specific Integrated Circuit (ASIC) or Field Programmable Gate Array (FPGA).

Memory 104 stores information accessible by processor 102, including instructions and data that may be executed or otherwise used by the processor 102. According to some examples, memory 104 may store instructions and data necessary to execute secure communication platform 120. In this regard, memory 104 may be any type of media capable of storing information accessible by the processor, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Memory 104 may include short-term or temporary storage, as well as long-term or persistent storage. According to some examples, memory 104 may include a storage area network (SAN) accessible by server 100 and/or secure communication platform 120.

User directory 106 may be any database or table capable of providing directory services. For example, user directory may include a corporate directory that include employees' first and last names, usernames, email address, phone numbers, department information, etc. Alternatively, user directory 106 may be a database or table to maintain user information for users of secure communication platform 120. In this regard, user directory 106 may be encrypted to protect the information contained therein. In some examples, user directory 106 may serve as a secure directory that includes a table of hashed usernames, a table of application identifiers, and a table of device identifiers for secure collaboration application. Accordingly, user directory 106 may be used to share information about users, systems, networks, services and applications. According to some examples, the user directory 106 may include a Lightweight Directory Access Protocol (LDAP), Active Directory, or an equivalent directory service.

Although FIG. 1 illustrates processor 102, memory 104, user directory 106, and secure communication platform 120 as being located on server 100, processor 102 and memory 104 may comprise multiple processors and memories that may or may not be stored within the same physical housing. For example, memory 104 may be a hard drive or other storage media located in a server farm of a data center, such as a storage area network (SAN). Accordingly, references to a processor, a computer, or a memory will be understood to include references to a collection of processors or computers or memories that may or may not operate in parallel. Further, the user directory 106 may be located in a separate physical housing from processor 102 and memory 104. Moreover, secure communication platform 120 may be distributed across multiple servers.

Secure communication platform 120 may be configured to facilitate the exchange of messages and communications for users of a secure collaboration application. As used herein, "messages" include text messages, chat room messages, control messages, commands, e-mails, documents, audiovisual files, Short Message Service messages (SMSes), Multimedia Messages Service messages (MMSes), and the like. Further, "communications" may include streaming data, such as video data and audio data transmitted as part of a voice or video call or a video conference, and application data transmitted as part of application sharing or screen sharing function. In some examples, the content of the messages and/or communications may pertain to sensitive information, such as electronic transactions, credit card information, password protection, directories, and storage drive protection, video on demand security, online gaming, gambling, electronic distribution of music, videos, documents, online learning systems, databases, cloud storage and cloud environments, bank transactions, voting processes, military communications, security of medical records, communication between medically implanted devices and doctors, etc. The exchange of messages and/or communications is explained in further detail below.

Secure communication platform 120 may provide encrypted messages and communications that easily integrate into and secure existing systems while providing compliant and secure messages and communications. In this regard, secure communication platform 120 may integrate with existing identity systems, such as user directory 106, or existing communication platforms, such as e-mail systems, messaging platforms, etc. In some examples, secure communication platform 120 may include built-in support for enterprise data retention and support systems as described in co-pending U.S. application Ser. No. 14/811,765, entitled "Enterprise Messaging Platform," the entirety of which is incorporated herein by reference.

Secure communication platform 120 may also include database 130. Database 130 may be a relational database that stores information in a variety of tables. In this regard, database 130 may include a record for each user of platform 120 to allow users to find and communicate with other users. Accordingly, database 130 may include a table of user names 132, a table of application identifiers 134, a pool of ephemeral keys 136, and a table of user profile information 138. User profile information may include a privacy mode set by the user and one or more privacy lists to control with whom the user may communicate. Additionally, database 130 may include a table of communications 140. That is, the secure communication platform may store messages for a predetermined time in table 140. For example, when a message is received, the secure communication platform may store the message in the table of communications 140 and provide an alert, such as a push notification, to the receiver. Accordingly, a receiver may access the secure communication platform to obtain his or her messages stored in table 140. In preferred examples, table 140 may store messages for 30 days; however, this may be adjusted, as needed, based on industry standards and/or to comply with regulatory schemes.

While a database is shown in FIG. 1, other techniques can be used to store the information used by platform 120 to facilitate the exchange of encrypted messages and/or communications. For example, the table of communications may be stored in a separate storage, such as memory 104 or a second server (shown below with respect to FIG. 5), instead of being stored within database 130. Alternatively, the information contained in the database 130 may be divided between database 130 and user directory 106. In this regard, database 130 and user directory 106 may interface to exchange information. Further, additional information can be securely stored on platform 120, whether in database 130 or another appropriate location.

Secure communication platform 120 may include one or more interfaces 122 for communicating with the first client device 116 and the second client device 118. As one example, platform 120 may provide an application programming interface (API) configured to communicate with applications installed on client devices. Platform 120 may also provide other types of interfaces, such as a web interface, or stand-alone software programs for desktops and laptops, running on various Operating Systems (OSes). The web interface may allow users of client devices to exchange messages and/or communications securely (whether with one another or other users), without the need for a separately installed collaboration application. The standalone software program may allow users to exchange secure messages and communications via software that is downloaded by each user. According to some examples, platform 120 may make available a master clock time available via the one or more interfaces 122. The master clock time may be used by client applications to enforce secure time-to-live (TTL) values of messages. The TTL values can be used to enforce (e.g., on behalf of a message sender) time constraints on message access (e.g., by a receiver).

Users of client devices, such as client devices 116 and 118, may communicate securely with one another using the techniques described herein. For example, the first client device 116 and the second client device 118 may make use of the secure communication platform 120, and the techniques described herein via, a first secure collaboration application 146 and a second secure collaboration application 148, respectively. As shown in FIG. 1, client devices may be mobile devices, such as a laptops, smart phones, or tablets, or computing devices, such as desktop computers or servers. As noted above, the secure collaboration application described herein allows cross-platform collaboration, thereby allowing users of various devices to communicate seamlessly. Further, each user may have different instances of the collaboration application installed across multiple devices. That is, the user of device 116 may be able to receive messages and/or communications on both device 116 as well as on any other devices that the user may have that includes a copy of the secure collaboration application, such as a laptop or desktop computer. In some examples, client devices 116 and 118 may be the users' personal devices (i.e. a bring your own device (BYOD) scenario). Alternatively, client devices may include other types of devices, such as sensors, game consoles, camera/video recorders, video players (e.g., incorporating DVD, Blu-ray, Red Laser, Optical, and/or streaming technologies), smart TVs, and other network-connected appliances, as applicable.

Messages and/or communications between users of client devices 116 and 118 may be exchanged via network 112. Network 112 may include various configurations and use various protocols including the Internet, World Wide Web, intranets, virtual private networks, local Ethernet networks, private networks using communication protocols proprietary to one or more companies, cellular and wireless networks (e.g., WiFi), instant messaging, HTTP and SMTP, and various combinations of the foregoing.

As will be described in greater detail below, processor 102 may perform a plurality of tasks on behalf of secure communication platform 120. Furthermore, whenever platform 120 is described as performing a task, either a single component or a subset of components or all components of platform 120 or server 100 may cooperate to perform the task. For example, platform 120 may designate one of the keys in a pool of ECDH public keys received from a user of a device as a "reserve" key. Another task performed by platform 120 may include facilitating the addition of new keys to a user's pool of public keys as they are used. Yet another task performed by platform 120 may include dynamically adjusting the size of a user's pool of public keys as needed.

Figure 2:
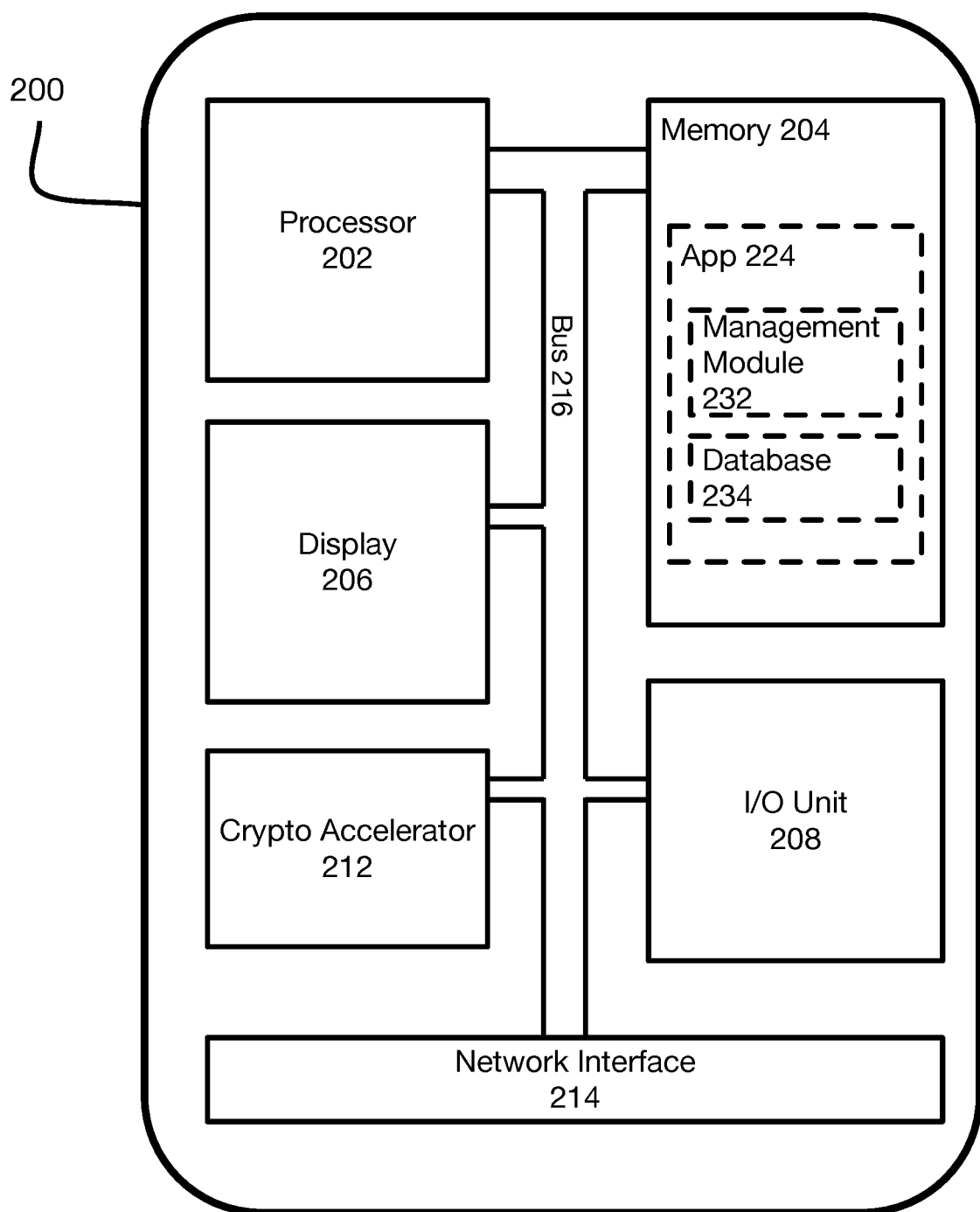
FIG. 2 illustrates a client device that is configured to transmit and receive encrypted communications using a secure collaboration application.

To make use of the secure communication platform described above, users must download and install the secure collaboration application on their client device. FIG. 2 illustrates an exemplary client device 200 that may access the security platform 120 via a secure collaboration application. In this regard, client device 200 includes a processor 202, a memory 204, a display 206, an I/O unit 208, a cryptographic ("crypto") accelerator 212, and a network interface 214 all interconnected by bus 216.

Processor 202 may be any processor capable of interacting with the components of client device 200. For example, processor 202 may include a processor, multiprocessors, multicore processor, a dedicated controller, such as an ARM processor, an ASIC, or an FPGA, or any combination thereof. According to some examples, processor 202 may be configured to initialize a secure communication session with at least one second device, perform a three-way handshake with the at least one second device to negotiate a first encryption key and a second encryption key for the secure communication session, and encrypt first communication data using the first encryption key. Processor 202 may also decrypt encrypted second communication data received from the at least one second device using the second encryption key and validate a token prior to performing the three-way handshake. In other examples, processor 202 may be configured to perform a second three-way handshake with at least one other device when a participant joins or leaves the secure communication session. Processor 202 may also be configured to perform a three-way handshake with the at least one second device to negotiate a first encryption key and a second encryption key for the secure communication session and encrypt first communication data using the first encryption key.

Memory 204 may store information accessible by processor 202, including instructions and data that may be executed or otherwise used by the processor 202 and/or crypto accelerator 212. For example, memory 204 may store instructions, such as application 224. In preferred examples, application 224 may be a secure collaboration application that provides users with the ability to participate in voice and video calls, share encrypted content, exchange encrypted communications, and share application data. Encrypted communications may include direct communications (e.g., one-to-one communications between a sender and receiver), group chats, or secure chat room communications. Data stored by memory 204 may include management module 232 and database 234. In the context of streaming data— such as during voice or video calls and application sharing, management module 232 may be configured to register streams of data with the server. In this regard, management module 232 may assign each stream a unique stream identifier and designate the stream in either an encode direction or a decode direction. Accordingly, the server receives the stream identifier and the direction designation and uses both pieces of information to subsequently route the streaming data the server receives. Database 234 may be encrypted via an encryption algorithm, such as Advanced Encryption Standard (AES), and a 256-bit key, referred to hereinafter as a local storage key. In some examples, database 234 may store information related to secure collaboration application 224. For example, database 234 may index information related to the secure collaboration application, such as key information (e.g. a user signing key, an application signing key, etc.), user information (e.g., username, application identifier, etc.), friend information, and communications. In this regard, communications transmitted and received by the secure collaboration application, including a message identifier, a hash of the sender's username, a hash of the sender's application identifier, a hash of the receiver's username, a hash of the receiver's application identifier, the communication encryption key, and a timestamp of each communication may be stored in database 234. Memory 204 may also store a plurality of ephemeral keys received from a second user that would allow the first and second user to exchange encrypted communication peer-to-peer. Accordingly, memory 204 may be any type of media capable of storing the above information, including a non-transitory computer-readable medium or any other suitable medium that stores data that may be read with the aid of an electronic device, such as a hard-drive, solid state drive, memory card, flash drive, ROM, RAM, DVD, or other optical disks, as well as other write-capable and read-only memories. Further, memory 204 may include short-term or temporary storage, as well as long-term or persistent storage.

Display 206 may be any electronic device capable of visually presenting information. In mobile devices, such as smart phones and tablets, display 206 may be a touchscreen display. Accordingly, display 206 may be integrated with I/O unit 208 to detect user inputs, as well as output data. In computing devices, display 206 may be an output, such as a VGA, DVI, or HDMI output, configured to connect to a monitor. In operation, display 206 may be configured to provide the decrypted communications from a second user or display an error message when receiver information is unobtainable, either from security platform 120 or locally on the sending device.

I/O unit 208 may be configured to receive input from a user and output data to the user. As noted above, the I/O unit 208 may work with touchscreen displays to receive input from a user. Alternatively, the I/O unit may be an interface capable of interacting with input and output devices, such as keyboards, mice, monitors, printers, etc. In operation, I/O 208 unit may be configured to allow a user to compose a communication before the communication is encrypted and transmitted to a receiver. Additionally, I/O unit 208 may include at least one accelerometer, a Global Positioning Satellite (GPS) system, a magnetometer, a proximity sensor, an ambient light sensory, a moisture sensor, a gyroscope, etc. to determine the orientation of the device, as well as environmental factors.

Crypto accelerator 212 may be dedicated hardware, software, firmware, or any combination thereof that is configured to perform cryptographic operations, such as key generation, random number generation, encryption/decryption, signature generation, signature verification, etc. In preferred examples, crypto accelerator 212 is a dedicated processor configured to perform cryptographic operations on behalf of processor 202. In this regard, application 224 may make use of crypto accelerator 212 to provide the secure communication functions described in greater detail below.

Figure 3A:
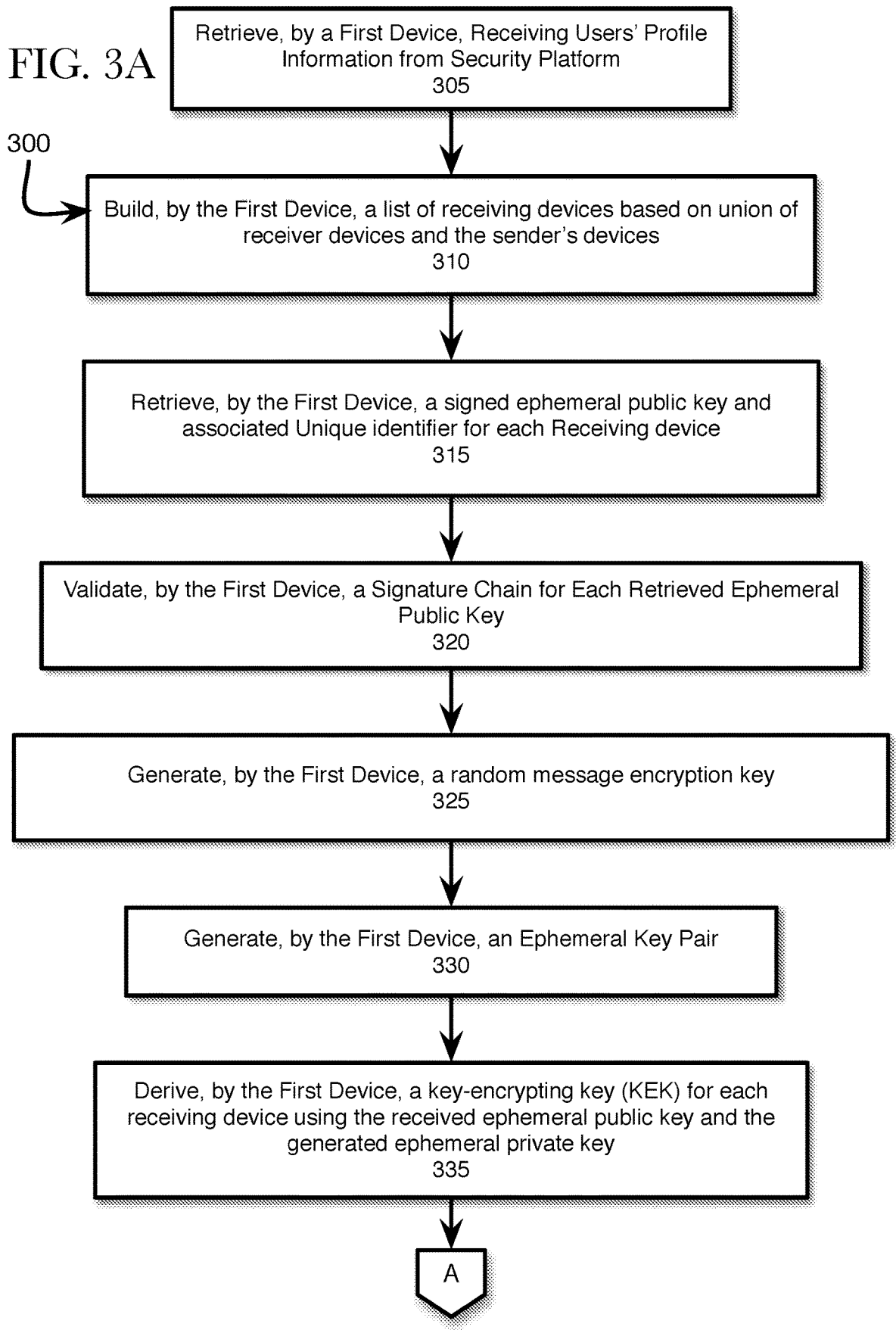

Network interface 214 may be dedicated hardware, software, firmware, or any combination thereof that is configured to connect client device 200 to network 112. In this regard, network interface 214 may include various configurations and use various communication protocols including Ethernet, TCP/IP, ATM, cellular and wireless communication protocols (e.g. 802.11, LTE), instant messaging, HTTP and SMTP, and various combinations of the foregoing. Network interface 214 may be configured to transmit encrypted first communication data to the at least one second device, receive encrypted second communication data from the at least one second device, and receive the token from the at least one second device. In other examples, interface 214 may be configured to receive an invitation to a secure communication session, transmit encrypted first communication data to at least one second device, and receive encrypted second communication data from the at least one second device Secure message exchanges provided by the secure communication platform can be best understood as providing device-to-device communication rather than user-to-user communication. As discussed above, a single user may have the secure collaboration application executing on multiple devices. For the purposes of transmitting a message, each instance of the secure collaboration application could be considered a device. For example, a first user with two devices who sends a message to a second user with three devices is sending an encrypted message to four devices—the three device devices associated with the second user, and the first user's second device. FIGS. 3A and 3B illustrate a process 300 for transmitting an encrypted message per this principle.

In block 305, a first device's secure collaboration application retrieves one or more receiving users' profile information from the secure communication platform 120. In this regard, the first device's secure collaboration application may request the receiving users' profile information from the secure communication platform 120. This may occur, for example, when the user of the first device begins composing the message. The user profile information includes the user's username, a list of the user's devices, a second public key for each device, and a signature of the second public key for each receiving device. Next, the first device's secure collaboration application builds a list of receiving devices based on a union of the receiver devices and the sender's devices in block 310. In block 315, the first device's secure collaboration application retrieves a signed ephemeral public key and its associated unique identifier. In examples where the first and second devices are communicating P2P, the first device's secure collaboration application retrieves the signed ephemeral public key and its associated unique identifier from local storage on the first device. In other examples, such as the first time the sender and receiver communicate, the first device's secure collaboration application may retrieve the signed ephemeral public key and its associated unique identifier for each of the receiving devices from the secure communication platform 120. In some examples, the initial communication between the parties may include an exchange of a plurality of ephemeral public keys, their associated identifiers, and a signature of each of the ephemeral public keys that allow P2P communications between the sender and receiver. Subsequent communications may use the plurality of ephemeral public keys transmitted in the initial exchange. These subsequent communications may include replenishments to the plurality of ephemeral public keys. According to other examples, the signed ephemeral public key and the associated unique identifier may be obtained along with the receiving users' profile information.

In block 320, the first device's secure collaboration application validates the signature chain for each ephemeral public key received from the secure communication platform. In this regard, the signature of the ephemeral public key is authenticated according to a signature verification algorithm, such as ECDSA, using the second public key; the signature of the second public is verified using the first public key; and the username corresponds to an expected user identity. If the signature chain is invalid, the secure collaboration application may request the one or more receiving users' profile information from the secure communication platform. Alternatively, the secure collaboration application may discard the communication and refuse to communicate with the one or more receiving devices with the invalid signature chain. If the signature chain is valid, then the secure collaboration application continues preparing the communication to send to the one or more receiver devices.

In block 325, the first device generates a random communication encryption key. In preferred examples, the random communication encryption key is a 256-bit key derived from a first set of pseudorandom bytes. Alternatively, the random communication encryption key may be generated by applying a key derivation function (e.g. HKDF) to the first set of pseudorandom bytes derived from a sending client's device. The first set of pseudorandom bytes may be derived from ephemeral environmental noise obtained from device drivers and other kernel operations. For example, data from the various sensors (e.g., the at least one accelerometer, Global Positioning Satellite (GPS) system, magnetometer, proximity sensor, ambient light sensor, moisture sensor, and gyroscope) may be used as the first set of pseudorandom bytes.

In block 330, the first device's secure collaboration application generates an ephemeral key pair. In some examples, the ephemeral key pair is generated using an asymmetric key generation algorithm, such as elliptic curve cryptography (ECC) or RSA. In block 335, the first device's secure collaboration application calculates a key-encrypting key (KEK) for each receiving device. The key-encrypting key is calculated by deriving a shared secret using the ephemeral private key the sending secure collaboration application generated and an ephemeral public key associated with the receiving device. In preferred examples, the shared secret is derived according to Diffie-Hellman key exchange. The shared secret and the receiving device's application identifier are inputted into a key derivation function to derive the KEK. By encrypting the random message encryption key with the KEK, the encrypted message is effectively bound to the receiver's secure collaboration application. This improves security by allowing only the receiving device to access the message. That is, a receiver would not be able to transfer the message from one device to another and still be able to decrypt the message since the keys used to generate the key-encrypting key are unique to the specific installation of the secure collaboration application. Block 335 may be repeated for each of the one or more receivers' devices.

After calculating the key-encrypting key for each of the one or more receivers' devices, the first device's secure collaboration application encrypts the message using the random message encryption key in block 340. In preferred examples, the message is encrypted via a symmetric encryption algorithm using the random message encryption key. In block 345, the message key is encrypted using the derived KEK for each of the receiving devices. After the random message encryption key has been encrypted with the KEK derived for each receiving device, process 300 proceeds to block 350, where the first device's secure collaboration application calculates a packet signature. In some examples, the packet signature is an HMAC-based signature derived from the encrypted message and header information. In block 355, the first device's secure collaboration application creates a serialized packet that includes the encrypted message, the ephemeral public key that the first device's secure collaboration application generated in block 330, the one or more unique identifiers for the receiver's ephemeral public key, the one or more encrypted message encryption keys, and the packet signature. In block 355, the first device's secure collaboration application transmits the serialized packet to the secure communication platform for distribution to the one or more receiving devices. In this way, the secure communication platform receives a single packet and distributes the single packet to the one or more receiving devices.

The secure communication platform provides each of the one or more receiving devices with an alert, such as a push notification, that they have received a new communication. The secure collaboration applications contact the secure communication platform and download the new communication to their devices. FIG. 4 illustrates a method 400 for receiving and decrypting an encrypted message on a receiving device.

In block 410, the first device (e.g. receiving device) receives a serialized packet from a second device (e.g. sending device). Receiving the serialized packet may include retrieving the serialized packet from the secure communication platform in response to receiving an alert or notification. Once received, the first device may verify the packet signature included in the serialized packet. If the packet signature is invalid, the first device may discard the serialized packet. However, when the packet signature is valid, the first device may continue processing the received serialized packet. In this regard, the first device is responsible for identifying the appropriate key material to decrypt the message content. If this is the first time the sending device and the receiving device have communicated, the first device may obtain information about the second device from the secure communication platform, such as the application identifier, the username, and user profile information of the sending device. The first device may store this information in database 234 for subsequent communication exchanges.

After obtaining the communication and information about the sender, the secure collaboration application on the first device uses its application identifier to retrieve the encrypted message key and the unique identifier of the first device's ephemeral key pair from the received serialized packet in block 420. In block 430, the first device's secure collaboration application uses the unique identifier to identify and retrieve the ephemeral private key from a local storage that corresponds to the ephemeral public key used by the second device to derive the KEK. According to some examples, the first device's secure collaboration application may decrypt the ephemeral private key retrieved from local storage using the first device's local storage device key. Next, the secure collaboration application on the first device calculates the key-encrypting key in block 440. Specifically, the first device calculates a shared secret using the first device's ephemeral private key and the second device's ephemeral public key. The shared secret and the first device's application identifier are inputted to a key derivation function to generate the key-encrypting key. In block 450, the first device's secure collaboration application decrypts the encrypted message encryption key. In block 460, the decrypted communication encryption key is used to decrypt the message. In block 470, the first device's secure collaboration application provides the decrypted message to the user. In block 480, the message may be encrypted with the first device's local storage device key and stored in a local storage on the first device.

In addition to exchanging encrypted messages, the secure collaboration application may allow users to exchange encrypted communications. Specifically, the secure collaboration application leverages the encryption and decryption algorithms above to initiate a secure communication session. As used herein, "secure communication session" includes an audio call, a video call, an audio conference, a video conference, and application sharing. FIG. 5 illustrates an exemplary process 500 for initiating a secure communication session.

In block 510, a secure collaboration application initializes a secure communication session by generating a meeting identifier and a first token. The secure collaboration application may initialize the secure communication session in response to receiving an input from a user. For example, a user in a one-to-one communication or a group chat may select an icon, such as a telephone icon or a video camera icon, to initiate the secure communication session. To configure the secure communication session, the initiating client's secure collaboration app generates a meeting identifier by hashing at least one property associated with the secure communication session. The at least one property may include the number of participants in the call, the date and time the call started, information identifying the initiating client (e.g., username, device identifier, application identifier, etc.), or any combination thereof. Additionally, the secure collaboration application generates a first token. The first token may be a password or passphrase. In other examples, the first token may be a set of pseudorandom bytes generated by the secure collaboration application. In further examples, the first token may be data for the receiver to sign with the receiver's private key.

In block 520, the call initiator's secure collaboration application generates a first encryption key. As noted above, the first encryption key may be a 256-bit key derived from a set of pseudorandom bytes. After generating the first encryption key, the call initiator's secure collaboration application encrypts the meeting identifier and the first token using the first encryption key in block 530. In preferred examples, the crypto accelerator encrypts the meeting identifier and first token using a symmetric encryption algorithm, such as Advanced Encryption Standard (AES), Data Encryption Standard (DES), or Triple DES (3DES).

In block 540, the encrypted meeting identifier and first token are encapsulated in a secure communication session invitation and transmitted to one or more receivers via a control channel. The invitation is a control message that includes information to configure the secure communication session. In block 550, the call initiator's secure collaboration application receives the first token from a first receiver. In preferred examples, the response is encrypted according to the techniques described above in FIGS. 3A-3B. Accordingly, the call initiator's secure collaboration application decrypts the response according to the processes described in FIG. 4.

In block 560, the call initiator's secure collaboration application validates the first token received from the first receiver. In preferred examples, the secure collaboration application compares the password or passphrase received from the first receiver to the password or passphrase set by the call initiator. In alternative examples, the secure collaboration application compares the set of pseudorandom bytes received from the first receiver to the set of pseudorandom bytes generated by the secure collaboration application. In yet other examples, the secure collaboration application validates the signature appended to the token using the first receiver's public key. If the first token is invalid, the secure collaboration application refuses to negotiate the transmission and receiving keys with the first receiver in block 570. In some examples, the secure collaboration application transmits a control message to the at least one second device terminating the secure communication session. Accordingly, an unauthorized user is prevented from joining the secure communication session.

If the first token is valid, process 500 proceeds to block 580 where the call initiator and first receiver negotiate transmission and receiving keys via a three-way handshake. As part of this negotiation, the call initiator and the first receiver may set parameters for when the transmission and receiving keys should be updated. These parameters may include updating the keys after a predetermined number of packets, after a predetermined time, when a new user enters an ongoing communication, when a member leaves the communication, etc. After negotiating the transmission and receiving keys, the call initiator and the first receiver exchange encrypted communications in block 590. The process 500 may be repeated, as necessary, for each of the one or more receivers participating in the secure communication session.

Figure 6:
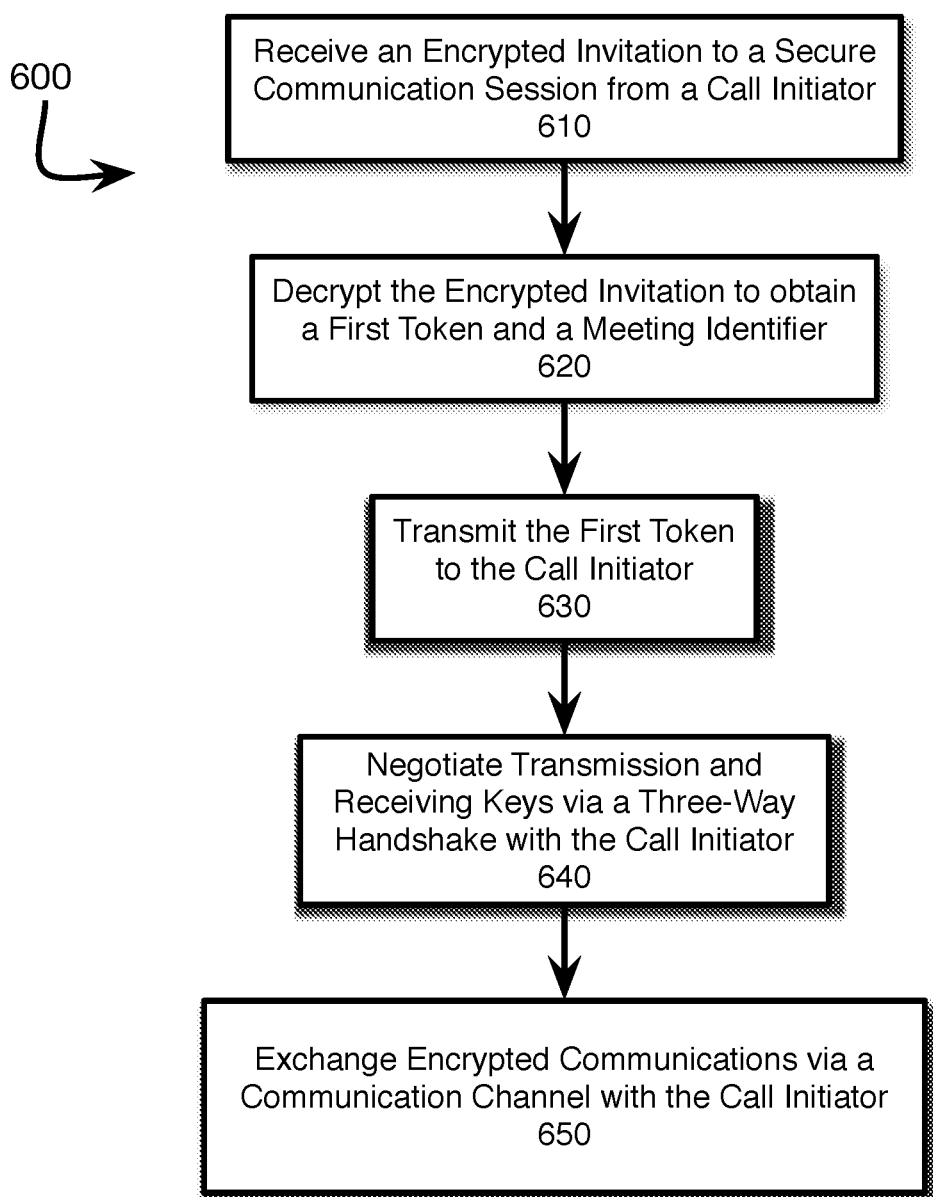
FIG. 6 illustrates a process for responding to an invitation to a secure communication session.

FIG. 6 illustrates an exemplary process 600 for responding to an invitation to a secure communication session. In block 610, a first receiver's secure collaboration application receives an encrypted invitation to a secure communication session from a call initiator via a control channel. In block 620, the first receiver's secure collaboration application decrypts the encrypted invitation to obtain a first token and a meeting identifier. In preferred examples, the invitation is decrypted using the techniques discussed above with respect to FIG. 4. The first receiver's secure collaboration application transmits the first token to the call initiator in block 630 as part of an authentication sequence. If the first token is invalid, the secure communication session may be terminated. According to some examples, first receiver's secure collaboration application may receive a control message indicating that the secure communication session is terminated when the first token is not valid. However, when the token is valid, the first receiver's secure collaboration application receives the first part of a three-way handshake to begin negotiating a transmission key and a receiving key with the call initiator via a communication channel in block 640. The details of the three-way handshake are discussed in greater detail below in FIG. 7. After negotiating transmission and receiving keys, the call initiator and the first receiver exchange encrypted communications via the communication channel. During these encrypted communications, the call initiator encrypts communication data via a symmetric encryption algorithm with a first key and the first receiver encrypts communication data via the symmetric encryption algorithm using a second key.

Figure 7B:
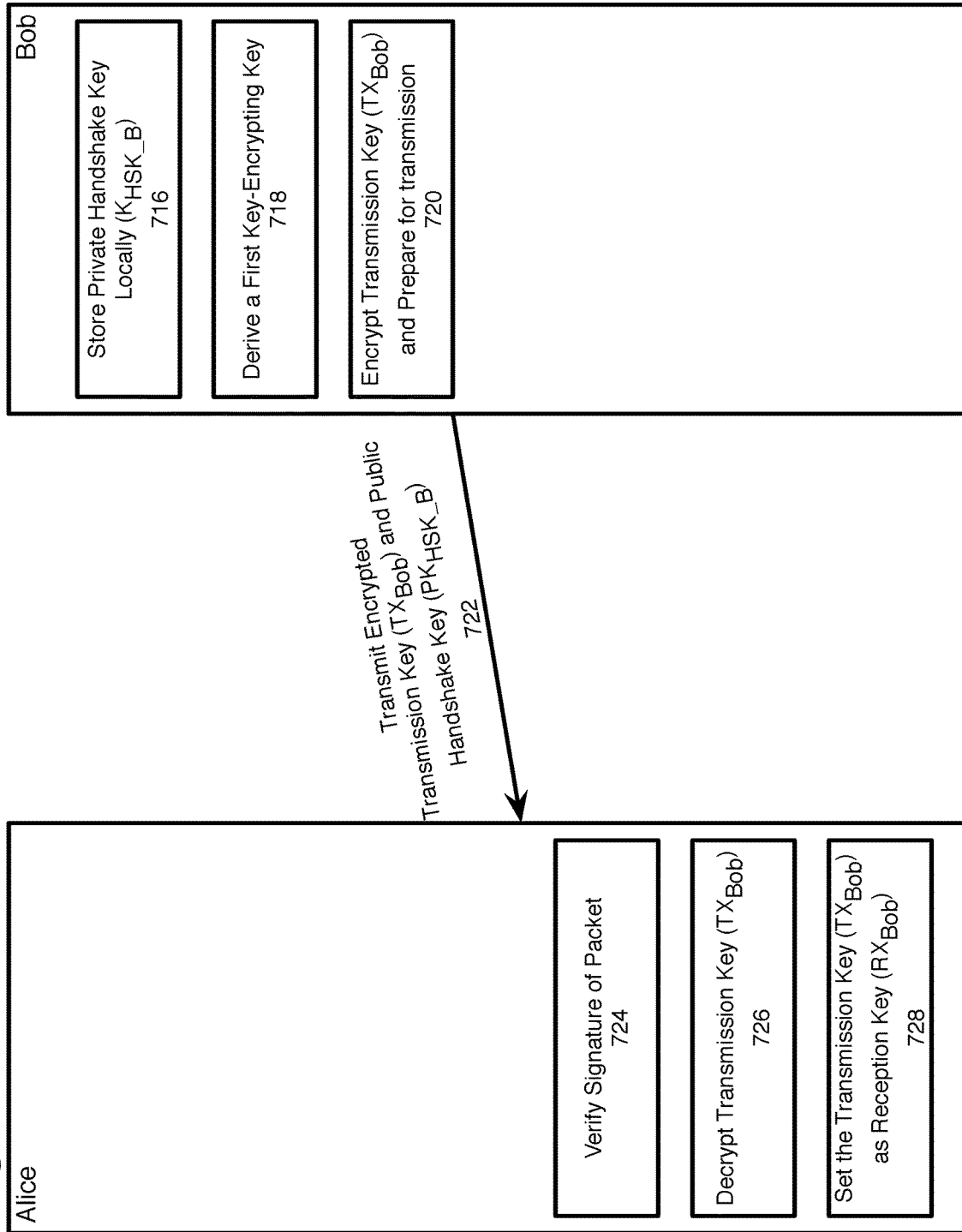
Figure 7C:
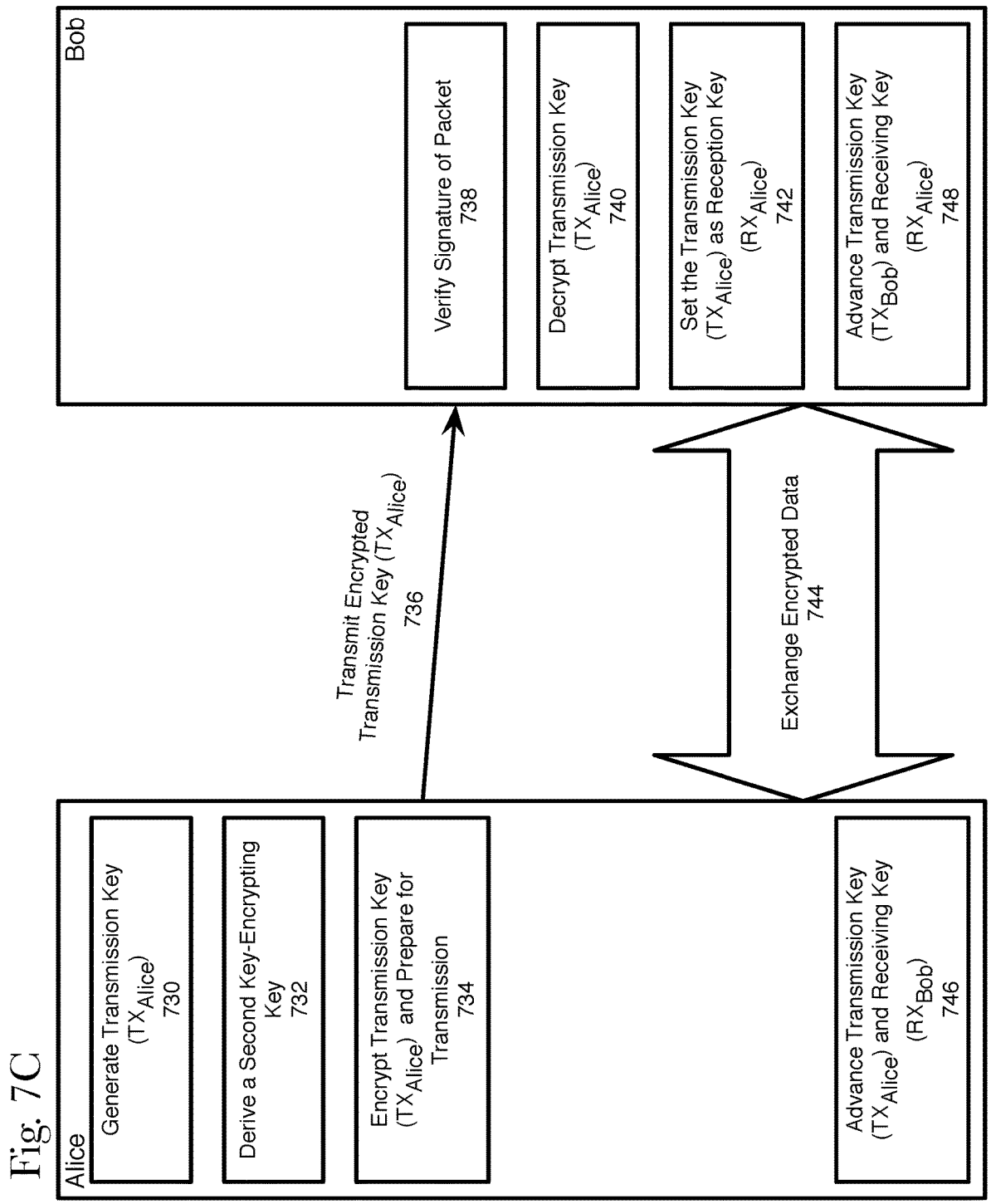

In order to establish the first and second keys used during the secure communication session, the call initiator and the one or more receivers negotiate transmission and receiving keys via a three-way handshake. FIGS. 7A-7C illustrate an exemplary process of negotiating transmission keys and receiving keys via the three-way handshake.

In FIGS. 7A-7C, "Alice" is the call initiator and "Bob" is the first receiver. After validating the token received from the first receiver, Alice's secure collaboration application begins the three-way handshake, in block 702, by generating a first handshake key pair ($K_{HSK\_A}$, $PK_{HSK\_A}$). In preferred examples, the first handshake key pair is an asymmetric key pair. The asymmetric key pair may be generated using any known technique, including ECC and RSA. In block 704, Alice's secure collaboration application stores the first private handshake key ($K_{HSK\_A}$) locally on her device. The first private handshake key ($K_{HSK\_A}$) may be stored in secure database 234, preferably encrypted with the local storage key.

In block 706, Alice's secure collaboration application prepares the first public handshake key ($PK_{HSK\_A}$) for transmission. Preparing the first public handshake key ($PK_{HSK\_A}$) for transmission includes signing the first public handshake key ($PK_{HSK\_A}$) and encapsulating the first public handshake key ($PK_{HSK\_A}$) and the signature in a packet. In block 708, the packet is transmitted to the first receiver's secure collaboration application. In preferred examples, the first public handshake key is transmitted to the first receiver, in-band, over a communication channel. As will be discussed in greater detail below, the communication channel is a separate and distinct channel from a control channel, over which the secure communication session invitation was transmitted.

In block 710, Bob's secure collaboration application receives the first public handshake key from Alice's secure collaboration application and verifies the signature of the received packet. When the signature is invalid, Bob's secure collaboration application discards the packet. However, when the signature is valid, Bob's secure collaboration application generates a first transmission key ($TX_{Bob}$) in block 712. In preferred examples, the first transmission key ($TX_{Bob}$) is a symmetric key generates from a set of pseudorandom bytes derived from Bob's device. Alternatively, the symmetric key may be generated by passing data, such as the set of pseudorandom bytes or other random data, through a key derivation function.

In block 714 Bob's secure collaboration application generates a second handshake key pair ($K_{HSK\_B}$, $PK_{HSK\_B}$). Much like the first handshake key pair, the second handshake key pair is an asymmetric key pair generated using known key derivation algorithms, including ECC, RSA, or an equivalent asymmetric key derivation algorithm. In block 716, Bob's secure collaboration application stores the second private handshake key ($K_{HSK\_B}$) locally on his device, preferably encrypted in a secure database. In block 718, Bob's secure collaboration application derives a first key-encrypting key (KEK) using the first public handshake key ($PK_{HSK\_A}$) and the second private handshake key ($K_{HSK\_B}$). In some examples, additional information, such as initiator information, receiver information, session identifier, etc., may be used to derive the first KEK to bind the first KEK to the secure communication session. Preferably, the first KEK is generated according to a key agreement protocol, such as ECDH. In block 720, Bob's secure collaboration application encrypts the first transmission key ($TX_{Bob}$) according to a symmetric encryption algorithm using the first KEK and prepares to transmit the encrypted first transmission key and the second public handshake key ($PK_{HSK\_B}$) to Alice's secure collaboration application. Preparing the encrypted first transmission key and the second public handshake key ($PK_{HSK\_B}$) for transmission includes generating a signature of at least the encrypted first transmission key and the second public handshake key ($PK_{HSK\_B}$) and encapsulating the encrypted first transmission key and the second public handshake key ($PK_{HSK\_B}$), along with the signature, in a packet. According to some examples, Bob's secure collaboration application also derives a first stream identifier and a fourth handshake key pair. The first stream identifier and fourth public handshake key may also be used in generating the signature and encapsulated in the packet transmitted to Alice's secure collaboration application. In still further examples, Bob's secure collaboration application may generate a first nonce to be used in a key advancement algorithm. As will be discussed in greater detail below, the first nonce is a salt that Alice's secure collaboration application may use to generate new keys to decrypt Bob's stream. The first nonce may also be used to generate the signature. The first nonce may also be encapsulated in the packet along with the information discussed above. In some examples, the first stream identifier and the first nonce may encrypted using the first KEK In block 722, at least one of the encrypted first transmission key ($TX_{Bob}$) and the second public handshake key ($PK_{HSK\_B}$) are transmitted to Alice's secure collaboration application. In preferred examples, the encrypted first transmission key ($TX_{Bob}$) and the second public handshake key ($PK_{HSK\_B}$) are transmitted over the communication channel. As noted above, the transmission may also include at least one of the first stream identifier; the fourth public handshake key, which Alice's secure collaboration application may use to derive a second key-encrypting key as discussed in greater detail below; and the first nonce.

In block 724, Alice's secure collaboration application receives the packet containing at least the encrypted first transmission key ($TX_{Bob}$) and the second public handshake key ($PK_{HSK\_B}$) and verifies the signature of the packet. As noted above, when the signature is invalid, Alice's secure collaboration application discards the packet and terminates the secure communication session. However, when the signature is valid, Alice's secure communication application decrypts the received packet, in block 726, to obtain the information contained therein. Decrypting the received packet may include deriving the first KEK using the first private handshake key ($K_{HSK\_A}$) and the second public handshake key ($PK_{HSK\_B}$). The first KEK may be used to decrypt the information contained in the packet received from Bob's secure collaboration application. As noted above, the information may include at least one of the first receiver's (Bob's) transmission key ($TX_{Bob}$), second public handshake key ($PK_{HSK\_B}$), the first stream identifier, the fourth public handshake key, and the first nonce.

In block 728, Alice's secure collaboration application sets the received transmission key ($TX_{Bob}$) as a reception key ($RX_{Bob}$) for data and information received over the communication channel from Bob's secure collaboration application. Block 728 may include associating the reception key ($RX_{Bob}$) with the first stream identifier received in the encrypted transmission in a memory. For example, the secure database discussed above may create an entry that associates the first stream identifier with the reception key. Thus, Alice's secure collaboration application may use the first stream identifier received in the streaming data subsequently received from Bob's secure collaboration application to retrieve reception key ($RX_{Bob}$) to decrypt the streaming communication data received from Bob's secure collaboration application.

In block 730, Alice's secure collaboration application generates a second transmission key ($TX_{Alice}$). Similar to the first transmission key discussed above, the second transmission key ($TX_{Alice}$) is a symmetric key that is derived from a set of pseudorandom bytes. Alternatively, the symmetric key may be derived by passing data, such as the set of pseudorandom bytes or other random data, through a key derivation function. Additionally, Alice's secure collaboration application may generate a second stream identifier, a third handshake key pair, and a second nonce. In block 732, Alice's secure collaboration application derives a second key-encrypting key (KEK). According to some examples, Alice's secure collaboration application uses the first private handshake key ($K_{HSK\_A}$) and the second public handshake key ($PK_{HSK\_B}$). To avoid generating a key identical to the first KEK, the secure collaboration application may use a salt or some other information, such as initiator information, receiver information, session identifier, etc., to bind the second KEK to the secure communication session and provide additional entropy to the second KEK. In other examples, Alice's secure collaboration derives the second KEK using the third private handshake key and the fourth public handshake key.

In block 734, Alice's secure collaboration application encrypts the second transmission key ($TX_{Alice}$) using the second KEK. In some examples, Alice's secure collaboration application may also encrypt a second stream identifier associated with information and/or data transmitted by Alice's secure collaboration application and the second nonce. Additionally, Alice's secure collaboration application generates a signature based on the information contained in the transmission and includes the signature in the packet. In block 736, Alice's secure collaboration application transmits the encrypted transmission key ($TX_{Alice}$) and the encrypted second stream identifier to Bob over the communication channel. In examples where Alice's secure collaboration application derives a third handshake key pair, the third public handshake key used to derive the second KEK is also transmitted to Bob in block 736. In block 738, Bob's secure collaboration application receives the packet and verifies the signature of the packet. When the signature is invalid, Bob's secure collaboration application discards the packet and terminates the secure communication session. However, when the signature is valid, Bob's secure communication application decrypts the received packet, in block 740, to obtain at least one of Alice's transmission key ($TX_{Alice}$), the second stream identifier, and the second nonce. In examples where Alice's secure collaboration application generates the third handshake key pair, Bob's secure communication application may retrieve the third public handshake key prior to decrypting Alice's transmission key ($TX_{Alice}$) and the second stream identifier.

In block 742, Bob designates the transmission key ($TX_{Alice}$) received from Alice as a reception key ($RX_{Alice}$) for data and information received over the communication channel from Alice's secure collaboration application. As discussed above, this designation may include associating the reception key ($RX_{Alice}$) with the second stream identifier such that Bob's secure collaboration application may decrypt communication data received from Alice using the designated reception key ($RX_{Alice}$). The process of blocks 702 through 742 may be repeated by the call initiator with each of the one or more receivers. Moreover, each one of the receivers may perform the three-way handshake described above with each of the other receivers.

After the participants of the secure communication session perform the three-way handshake, the participants of the secure communication session exchange encrypted communication data in block 744. As noted above, the encrypted communication data may include video or audio data related to a call or conference. In some examples, the encrypted communication data may comprise application sharing data. During the secure communication session, the encryption keys used to encrypt the communication data may evolve to prevent interlopers from eavesdropping. In block 746, Alice's secure collaboration application may update Alice's transmission key ($TX_{Alice}$) and Bob's receiving key ($RX_{Bob}$)

during the secure communication session. At, or about, the same time, Bob's secure collaboration application may also update Bob's transmission key ($TX_{Bob}$) and Alice's receiving key ($RX_{Alice}$), in block 748, while the secure communication session is in progress. The updates to both keys may occur according to an agreed upon key advancement algorithm. An example of key advancement is illustrated below with regard to FIG. 9. Thus, for example, Alice's secure collaboration application encrypts first communication data transmitted to the one or more receivers with a first encryption key and decrypts second communication data received from a first receiver with a second key prior to the triggering event. After the triggering event, Alice's secure collaboration application encrypts first communication data transmitted to the one or more receivers with a third encryption key and decrypts second communication data received from the first receiver with a fourth encryption key. The triggering event may be the exchange of a predetermined number of packets or after a predetermined amount of time has elapsed. In some examples, there may be overlap between the previous keys and the new keys to reduce the amount of data lost due to the previous key being revoked, thereby allowing for a smoother transition.

Additionally, participants may enter and leave during a group secure communication session, further necessitating the need to update the encryption keys used. In order to prevent unauthorized users from accessing the secure communication session, new transmission and receiving keys may be established by performing a second three-way handshake when participants enter and/or leave the secure communication session. The second three-way handshake may occur over the communication channel during the secure communication session to provide a secure technique to update keys for users while they are on participating in the secure communication session.

Figure 8:
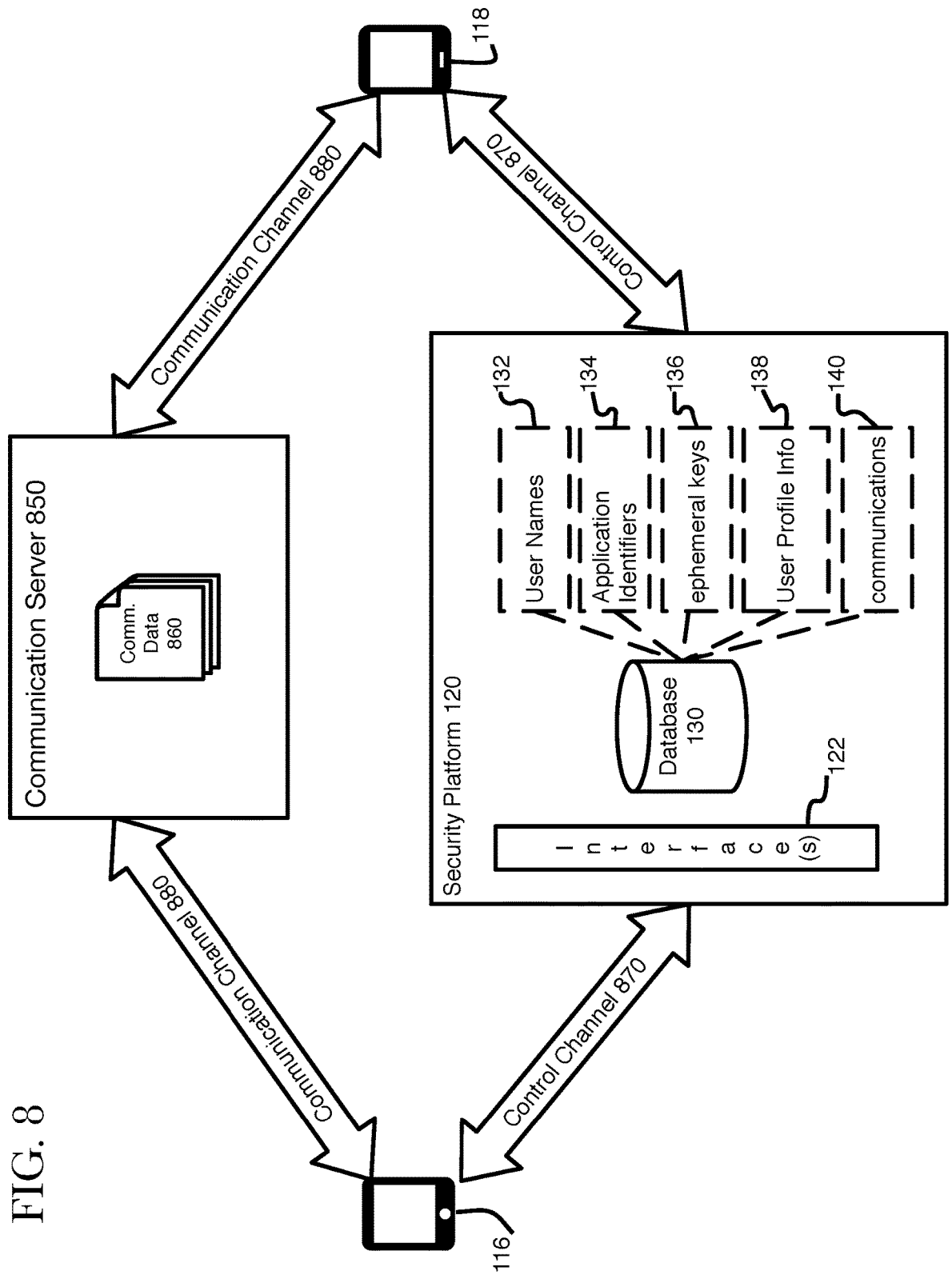
FIG. 8 illustrates a system-level view for providing secure communication sessions according to one aspect of the disclosure.

As noted above, the invitation to the secure communication session is transmitted over a control channel and the encrypted communication data, including streaming data and the three-way handshake, is transmitted over a communication channel. FIG. 8 illustrates a system-level overview for the exchange of data over the control channel and the communication channel.

FIG. 8 shows a first client device 116 and a second client device 118 exchanging data with a security platform 120 via a control channel 870 and a communication server 850 via a communication channel 880. The first client device 116, the second client device 118, and the security platform 120 were described above with respect to FIG. 1. As discussed above, security platform 120 facilitates the exchange of encrypted messages, communications, and control messages. Control channel 870 may be an encrypted communication channel, such as Transport Layer Security (TLS) or Secure Sockets Layer (SSL), through a public network, such as the Internet, World Wide Web, local Ethernet networks, private networks using communication protocols proprietary to one or more companies, and cellular and wireless networks (e.g., WiFi). As noted above, security platform 120 may use control channel 870 to exchange text messages, chat room messages, control messages, commands, e-mails, documents, audiovisual files, Short Message Service messages (SMSes), Multimedia Messages Service messages (MMSes), and the like. Control messages include commands and instructions sent from either the security platform 120 or a first user's secure collaboration app to a second user's secure collaboration app. Additionally, these control messages may include configuration information to allow the first and second user collaboration apps to configure a secure chat room, initialize an encrypted call, or securely transfer a file.

Like control channel 870, communication channel 880 may be an encrypted communication channel through a public network. Communication channel 880 differs from control channel 870 in that it is primarily used to exchange streaming communications, such as video, audio, and application data. Additionally, the three-way handshake described above may be performed over communication channel 880 to prevent malicious users from intercepting the key agreement data. In preferred examples, control channel 870 and communication channel 880 are two separate, unique communication channels.

In addition to communicating with security platform 120, client devices 116 and 118 may also access the communication server 850 to exchange streaming communications, such as video, audio, and application data, with other devices. Additionally, the three-way handshake discussed above with respect to FIGS. 7A-7C may pass through communication server 850. According to preferred examples, the secure collaboration application permits clients to encrypt communication data before uploading the communication to the communication server 850. In some example, communication server 850 and the security platform 120 may be co-located. In alternative examples, the communication server 850 and the security platform 120 may be physically separated on two different servers.

Figure 9:
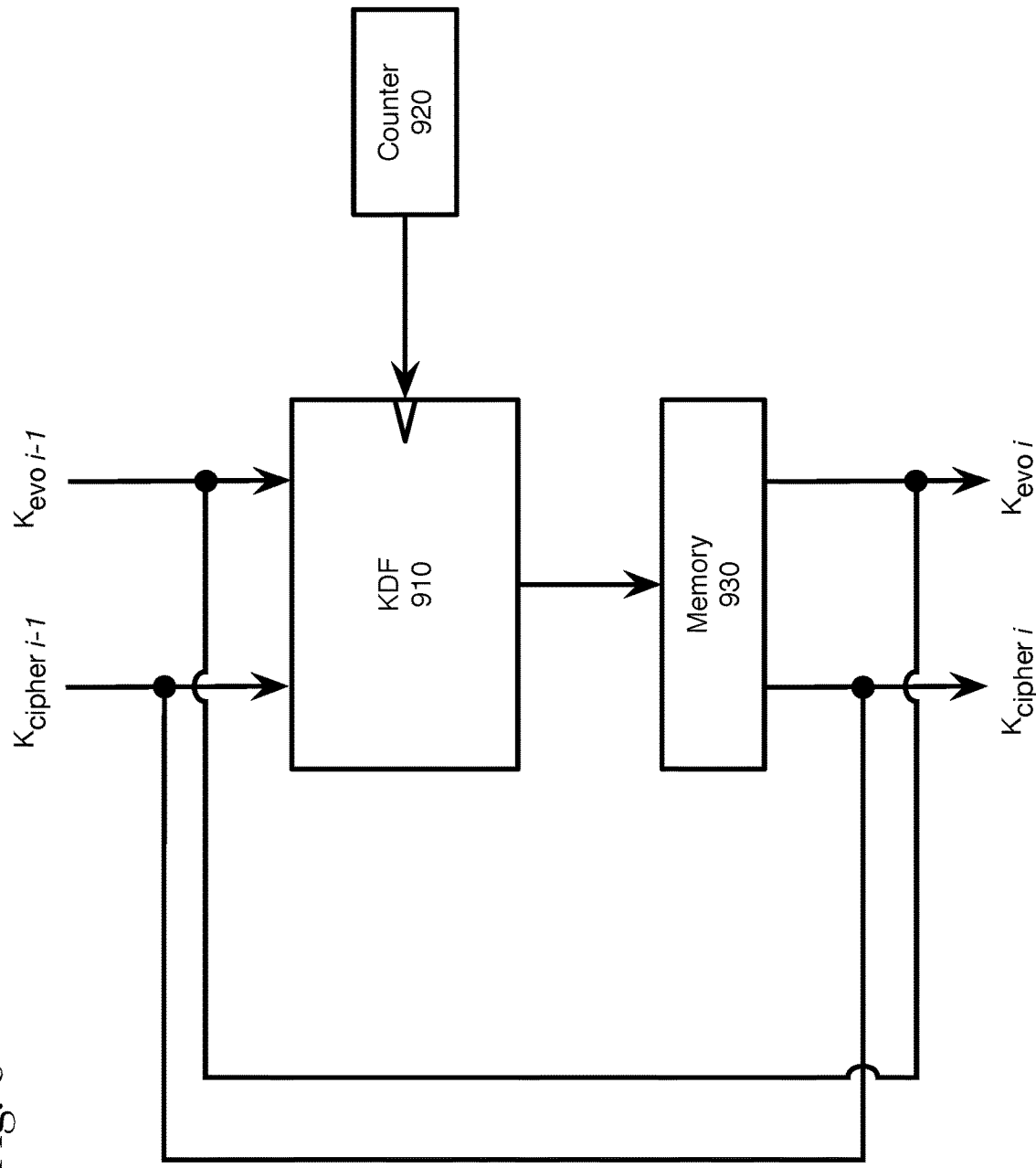
FIG. 9 shows a process for advancing encryption keys.

In order to communicate more securely, it is necessary to update the transmission and receiving keys periodically. However, updating keys is difficult and increases the risk of being intercepted by a malicious user. FIG. 9 shows a secure process for updating transmission keys in-band during a secure communication session that updates keys seamlessly while preventing an eavesdropper from intercepting the transmission keys.

FIG. 9 shows a key derivation function (KDF) 910 connected to counter 920 and memory 930. KDF 910 may be hardware, such as the cryptographic accelerator described above, software, firmware, or any combination thereof. In preferred examples, KDF 910 is a hash-based key derivation function (HKDF) to create cryptographically strong key material. KDF 910 typically has three inputs and one output. The first input and the second input receive cryptographic material used to derive the key material. As illustrated in FIG. 9, the first input receives a previous encryption key ($K_{cipher_{i-1}}$) and the second input receives a salt ($K_{evol_{i-1}}$), such as the nonce value established during the three-way handshake. Typically, the previous encryption key is either a transmission key or a receiving key established during the three-way handshake described above. In operation, the transmission key and the receiving key may be updated concurrently using the techniques described herein in response to an external trigger, such as counter 920. Counter 920 may track the number of packets exchanged. In alternative examples, counter 920 may be a timer to record a predetermined amount of time. In both examples, counter 920 may send a signal to KDF 910 to generate new key material (e.g. after a predetermined number of packets have been exchanged (e.g. 500, 1000 packets) or after a predetermined amount of time). In some examples, a user may not transmit packets or any other data if his/her microphone is muted and/or camera is off. According to these examples, the counter 920 may advance a predetermined number at time intervals to pace the exchange of information occurring during the secure communication session.

As noted above, a new participant performs a three-way handshake with each participant of the secure communication session to establish transmission and receiving keys. In some embodiments, a signal may be sent to KDF 910 to the participants of the secure communication session to advance the keys in response to a new participant joining a secure communication session. This provides an additional layer of security that prevents the new participant from accessing information prior to the new participant joining the secure communication session. Furthermore, having existing participants of the secure communication session perform the key advancement algorithm instead of performing another three-way handshake would allocate more resources (e.g., bandwidth) to the secure communication session data.

New key material is outputted from KDF 910 and written to memory 930. Memory 930 may be any type of physical memory, such as a cache, hard-drive, solid state drive, memory card, flash drive, ROM, RAM, DVD, or other optical disks, as well as any other write-capable and read-only memories. Alternatively, memory 930 may be a secure allocation of memory space reserved by the secure collaboration application, such as a buffer. In preferred examples, memory 930 is 64 bytes, although any size buffer may be used. The most significant bytes (e.g., 0-31) may be outputted as the next encryption key ($K_{cipher\ i}$) and the least significant bytes (e.g. 32-63) may serve as the nonce value ($K_{evo\ i}$). The next encryption key ($K_{cipher\ i}$) may be used to encrypt and/or decrypt data exchanged during the secure communication session; while both the encryption key ($K_{cipher\ i}$) and the nonce value ($K_{evo\ i}$) are inputted back into KDF 910 to seed future encryption keys and nonce values. According to some examples, the nonce value established during the three-way handshake may be a static value that is used to seed all the keys. That is, the least significant bytes may be a static value during the entirety of the secure communication session.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

What is claimed is:

1. A method for generating new encryption keys during a secure communication session, the method comprising:
    deriving, by a first device, a first encryption key and a first nonce;
    receiving, by the first device and from at least one second device, a second encryption key;
    storing, by the first device, the first encryption key, the second encryption key, and the first nonce in a memory;
    encrypting, by the first device, first communication data using the first encryption key;
    transmitting, by the first device, the encrypted first communication data to the at least one second device during a first secure communication session;
    receiving, by the first device and from the at least one second device, encrypted second communication data during the first secure communication session;
    decrypting the second communication data using the second encryption key;
    detecting, during the first secure communication session, an event;
    inputting, by the first device and based on detecting the event, the first encryption key and the first nonce into a key derivation function to generate a third encryption key and a second nonce;
    inputting, by the first device and based on detecting the event, the second encryption key and the first nonce into the key derivation function to generate a fourth encryption key; and
    storing, by the first device, the third encryption key, the fourth encryption key, and the second nonce in the memory.

2. The method of claim 1, wherein the memory is a buffer.

3. The method of claim 1, further comprising:
    encrypting, by the first device, third communication data using the third encryption key after to the event; and
    transmitting, by the first device and to the at least one second device, the encrypted third communication data during the first secure communication session.

4. The method of claim 1, further comprising:
    receiving, by the first device and from the at least one second device, encrypted fourth communication data after the event; and
    decrypting, by the first device, the fourth communication data using the fourth encryption key.

5. The method of claim 1, wherein the event is an exchange of a predetermined number of packets.

6. The method of claim 1, wherein the event is a predetermined amount of time elapsing.

7. The method of claim 1, further comprising:
    storing, on the first device, the first encryption key for a predetermined period after the event.

8. The method of claim 1, wherein the second nonce is equal to the first nonce.

9. A non-transitory computer-readable medium comprising instructions that when, executed by at least one processor, perform the steps of:
    deriving a first encryption key and a first nonce;
    receiving, from at least one second device, a second encryption key;
    storing the first encryption key, the second encryption key, and the first nonce in a memory;
    encrypting first communication data using the first encryption key;
    transmitting the encrypted first communication data to the at least one second device during a first secure communication session;
    receiving, from the at least one second device, encrypted second communication data during the first secure communication session;
    decrypting the second communication data using the second encryption key;
    detecting, during the first secure communication session, an event;
    inputting the first encryption key and the first nonce into a key derivation function in response to an event to generate a third encryption key and a second nonce;
    inputting, by the first device and based on detecting the event, the second encryption key and the first nonce into the key derivation function to generate a fourth encryption key; and storing the third encryption key, the fourth encryption key, and the second nonce in the memory.

10. The non-transitory computer-readable medium of claim 9, further comprising instructions for:
encrypting third communication data using the third encryption key after the event; and
transmitting the encrypted third communication data to the at least one second device during the first secure communication session.

11. The non-transitory computer-readable medium of claim 9, wherein the event comprises a predetermined number of packets exchanged between a first device and the at least one second device.

12. The non-transitory computer-readable medium of claim 9, wherein the event is a predetermined amount of time elapsing.

13. The non-transitory computer-readable medium of claim 9, comprising instructions for:
receiving encrypted fourth communication data from the at least one second device after the event; and
decrypting the fourth communication data using the fourth encryption key after the event.

14. A computing device comprising:
one or more processors; and
memory storing instructions that, when executed by the one or more processors, cause the computing device to:
derive a first encryption key and a first nonce;
receive, from at least one second device, a second encryption key;
store the first encryption key, the second encryption key, and the first nonce;
encrypt first communication data using the first encryption key;
transmit the encrypted first communication data to the at least one second device during a first secure communication session;
receive, from the at least one second device, encrypted second communication data during the first secure communication session;
decrypt the second communication data using the second encryption key;
detect, during the first secure communication session, an event;
input, based on detecting the event, the first encryption key and the first nonce into a key derivation function to generate a third encryption key and a second nonce;
input, based on detecting the event, the second encryption key and the first nonce into the key derivation function to generate a fourth encryption key; and
store the third encryption key, the fourth encryption key, and the second nonce.

15. The computing device of claim 14, wherein the instructions, when executed by the one or more processors, cause the computing device to:
encrypt third communication data using the third encryption key after to the event; and
transmit, to the at least one second device, the encrypted third communication data during the first secure communication session.

16. The computing device of claim 14, wherein the instructions, when executed by the one or more processors, cause the computing device to:
receive, from the at least one second device, encrypted fourth communication data after the event; and
decrypt the fourth communication data using the fourth encryption key.

17. The computing device of claim 14, wherein the event is an exchange of a predetermined number of packets.

18. The computing device of claim 14, wherein the event is a predetermined amount of time elapsing.

19. The computing device of claim 14, wherein the instructions, when executed by the one or more processors, cause the computing device to:
store the first encryption key for a predetermined period after the event.

20. The computing device of claim 14, wherein the second nonce is equal to the first nonce.

* * * * *